US012346063B2

(12) United States Patent
Seino et al.

(10) Patent No.: US 12,346,063 B2
(45) Date of Patent: Jul. 1, 2025

(54) DEVELOPING APPARATUS

(71) Applicant: CANON KABUSHIKI KAISHA, Tokyo (JP)

(72) Inventors: Yuzo Seino, Shizuoka (JP); Kenta Kamikura, Kanagawa (JP); Noriyuki Doi, Shizuoka (JP); Takuho Sato, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 856 days.

(21) Appl. No.: 17/524,311

(22) Filed: Nov. 11, 2021

(65) Prior Publication Data

US 2022/0155700 A1 May 19, 2022

(30) Foreign Application Priority Data

Nov. 17, 2020 (JP) ................................ 2020-191173

(51) Int. Cl.
*G03G 15/08* (2006.01)
*G03G 9/08* (2006.01)
*G03G 9/093* (2006.01)

(52) U.S. Cl.
CPC ....... *G03G 9/09328* (2013.01); *G03G 9/0823* (2013.01); *G03G 9/09378* (2013.01); *G03G 15/0812* (2013.01)

(58) Field of Classification Search
CPC ......................... G03G 15/0818; G03G 9/0823
See application file for complete search history.

(56) References Cited

U.S. PATENT DOCUMENTS

| | | | |
|---|---|---|---|
| 9,556,359 | B2 | 1/2017 | Suzumura et al. |
| 9,921,513 | B2 | 3/2018 | Masu et al. |
| 9,989,879 | B2 | 6/2018 | Doi et al. |
| 10,036,971 | B2 | 7/2018 | Doi et al. |
| 10,078,286 | B2 | 9/2018 | Takeno et al. |
| 10,365,576 | B2 | 7/2019 | Doi et al. |

(Continued)

FOREIGN PATENT DOCUMENTS

| | | |
|---|---|---|
| JP | 2005-331782 A | 12/2005 |
| JP | 2008-58874 A | 3/2008 |

OTHER PUBLICATIONS

Iwamoto Mitsumasa et al., Charge Storage and Carrier Transport at Organic Semiconductor-Insulator Interface, J. Surf. Sci. Soc. Jap., vol. 29, No. 2 (2008) 105-13.

*Primary Examiner* — Peter L Vajda
(74) *Attorney, Agent, or Firm* — VENABLE LLP

(57) ABSTRACT

A developing apparatus comprising a toner and a toner bearing member for bearing the toner, wherein the volume resistivity of the toner is from $1.0\times10^{10}$ Ω·cm to $1.0\times10^{14}$ Ω·cm, a toner bearing member exhibits multiple elementary processes, the volume resistance value Rdr per unit area of the toner bearing member is from $5.0\times10^{5}$ Ω/cm$^2$ to $2.0\times10^{8}$ Ω/cm$^2$, the capacitance Cdr per unit area of the toner bearing member is from 300 pF/cm$^2$ to 900 pF/cm$^2$, and the capacitance per unit area and volume resistance value of the toner as converted by a parallel plate capacitor model at a thickness of 1.5 times the weight-average particle diameter of the toner are in specific relationships.

8 Claims, 3 Drawing Sheets

(56) References Cited

U.S. PATENT DOCUMENTS

| | | | | |
|---|---|---|---|---|
| 10,459,356 | B2 | 10/2019 | Takeno et al. | |
| 10,635,019 | B2 | 4/2020 | Doi et al. | |
| 10,678,161 | B2 | 6/2020 | Tsuru et al. | |
| 2002/0154917 | A1 * | 10/2002 | Aoki .................. | G03G 15/0907 399/55 |
| 2008/0279591 | A1 | 11/2008 | Yasunaga | |
| 2014/0072343 | A1 | 3/2014 | Masu et al. | |
| 2014/0080691 | A1 | 3/2014 | Kurachi et al. | |
| 2021/0026260 | A1 | 1/2021 | Noguchi et al. | |
| 2021/0026268 | A1 | 1/2021 | Murakami et al. | |

* cited by examiner

DEVELOPING APPARATUS

BACKGROUND OF THE INVENTION

Field of the Invention

The present disclosure relates to an image-forming apparatus such as a copier or printer.

In particular, the present disclosure relates to a developing apparatus having a conductive toner that exhibits electrical conductivity under applied voltage equal to or less than the dielectric breakdown field strength of air, and also having a toner bearing member for bearing the toner, and moreover having a toner regulating member for regulating the toner.

Description of the Related Art

The uses of image-forming apparatuses using electrophotographic systems have expanded in recent years to include a range of applications from printers and copiers to commercial printers. In this context, image-forming apparatuses are required to provide even greater speeds and quality.

The developing apparatuses built into conventional image forming apparatuses employ triboelectric charging systems, and problems have been indicated with broad toner charge quantity distributions and large time constants associated with the toner charge rising performance. As a means of solving these problems, charge-injection charging systems using conductive toners have been proposed.

The following disclosures relate to developing apparatuses using charge-injection charging systems.

For example, Japanese Patent Application Publication No. 2008-58874 proposes charging a toner by both charge injection from a regulating blade and triboelectric charging through contact with a toner bearing member.

Specifically, Japanese Patent Application Publication No. 2008-58874 proposes a conductive toner having electrical characteristics such that a pressure molded toner pellet has a DC resistance of from $1\times10^{7}$ to $1\times10^{9}$ (Ω·cm) and a capacitance of from $1.0\times10^{-12}$ to $1.5\times10^{-11}$ (F).

Japanese Patent Application Publication No. 2005-331782 discloses a conductive toner, a toner bearing member and a developing system using a charge-injection charging system. The electrical characteristics of the conductive toner are described in Paragraph 27, FIG. 19.

This toner exhibits non-linear current-voltage characteristics, with insulating properties of $10^{16}$ (Ω·cm) at a field strength of $8\times10^{3}$ (V/cm) and conductive properties of $10^{9}$ (Ω·cm) at a field strength of $7\times10^{4}$ (V/cm). A high-resistance layer having volume resistivity of at least $10^{11}$ (Ω·cm) is also formed on the surface of the toner bearing member.

As the specific toner bearing member, Example 1 describes an anodized aluminum pipe, while Example 2 describes a 12 μm-thick PET film wrapped around the toner bearing member.

SUMMARY OF THE INVENTION

When the conductive toner described in Japanese Patent Application Publication No. 2008-58874 is combined with a high-resistance toner bearing member exhibiting insulting dielectric properties, the electrostatic attraction of the toner bearing member increases, and surface contamination of the toner bearing member becomes more likely. It has also been found that if this conductive toner is instead combined with a conductive toner bearing member in an effort to suppress toner contamination, the electrostatic energy loss of the toner increases, and the electrification charge quantity of the toner decreases.

The conductive toner described in Japanese Patent Application Publication No. 2005-331782 exhibits non-linear current-voltage characteristics, and has a threshold voltage at which the insulating properties change to conductive properties.

Because of these properties, it has been found that the desired injection field strength for toner conductivity has to be as high as $1\times10^{5}$ (V/cm), increasing the applied voltage between the toner bearing member and the regulating blade. Because the surface layer of the toner bearing member becomes highly resistant, moreover, the electrostatic attraction of the toner bearing member increases, and surface contamination of the toner bearing member becomes more likely.

As discussed above, it is difficult to maintain the toner charge quantity while preventing surface contamination of the toner bearing member when using a conductive toner in a conventional charge-injection charging system. Furthermore, a greater applied voltage is required to obtain the desired toner charge quantity.

The present disclosure provides a developing apparatus whereby both conductivity and charge retention of a conductive toner can be achieved and an increase in the applied voltage during charge injection can be suppressed to achieve high-quality image formation in a charge-injection charging system.

The present disclosure relates to a developing apparatus comprising a toner, a toner bearing member for bearing the toner, and a toner regulating member contacting the toner bearing member and regulating the toner borne on the toner bearing member, wherein a volume resistivity of the toner as determined by impedance measurement is from $1.0\times10^{10}$ Ω·cm to $1.0\times10^{14}$ Ω·cm, the toner bearing member exhibits multiple elementary processes in the impedance measurement, a volume resistance value Rdr per unit area of the toner bearing member is from $5.0\times10^{5}$ Ω/cm$^2$ to $2.0\times10^{8}$ Ω/cm$^2$, a capacitance Cdr per unit area of the toner bearing member is from 300 pF/cm$^2$ to 900 pF/cm$^2$, and given Ctn (pF/cm$^2$) as a capacitance per unit area of the toner and Rtn (Ω/cm$^2$) as a volume resistance value per unit area of the toner as converted by a parallel plate capacitor model at a thickness of 1.5 times a weight-average particle diameter D4 of the toner as obtained by an electrical detection band method based on the volume resistivity and capacitance obtained by the impedance measurement, following formula (1) and formula (2) are satisfied:

$$1.5\leq(Cdr/Ctn)\leq4.5 \quad (1)$$

$$1.0\times10^{-4}\leq(Rdr/Rtn)\leq1.0 \quad (2)$$

With the present disclosure, it is possible to provide a developing apparatus whereby both conductivity and charge retention of a conductive toner can be achieved and an increase in the applied voltage during charge injection can be suppressed to achieve high-quality image formation in a charge-injection charging system. Further features of the present invention will become apparent from the following description of exemplary embodiments with reference to the attached drawing.

DESCRIPTION OF THE EMBODIMENTS

Figure 1:
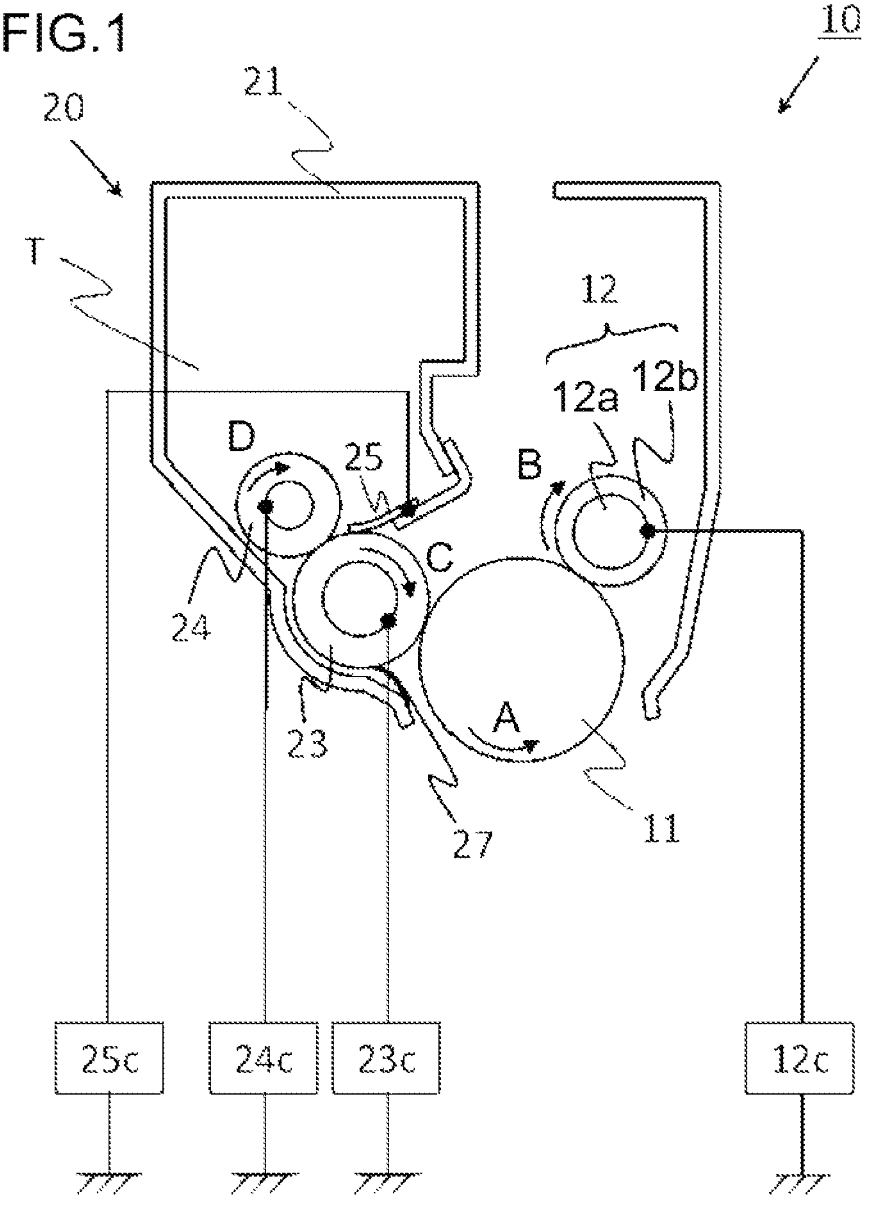
FIG. 1 is an example of a cross-section of a process cartridge with a built-in developing apparatus.

The expression of "from XX to YY" or "XX to YY" indicating a numerical range means a numerical range including a lower limit and an upper limit which are end points, unless otherwise specified.

The inventors discovered as a result of earnest research that a developing apparatus capable of controlling interfacial conductivity and achieving high-quality image formation could be provided with the following developing apparatus.

The present disclosure relates to a developing apparatus comprising a toner, a toner bearing member for bearing the toner, and a toner regulating member contacting the toner bearing member and regulating the toner borne on the toner bearing member, wherein a volume resistivity of the toner as determined by impedance measurement is from $1.0\times10^{10}$ Ω·cm to $1.0\times10^{14}$ Ω·cm, the toner bearing member exhibits multiple elementary processes in the impedance measurement, a volume resistance value Rdr per unit area of the toner bearing member is from $5.0\times10^{5}$ Ω/cm$^2$ to $2.0\times10^{8}$ Ω/cm$^2$, a capacitance Cdr per unit area of the toner bearing member is from 300 pF/cm$^2$ to 900 pF/cm$^2$, and given Ctn (pF/cm$^2$) as a capacitance per unit area of the toner and Rtn (Ω/cm$^2$) as a volume resistance value per unit area of the toner as converted by a parallel plate capacitor model at a thickness of 1.5 times a weight-average particle diameter D4 of the toner as obtained by an electrical detection band method based on the volume resistivity and capacitance obtained by the impedance measurement, following formula (1) and formula (2) are satisfied:

$$1.5\leq(Cdr/Ctn)\leq4.5 \quad (1)$$

$$1.0\times10^{-4}\leq(Rdr/Rtn)\leq1.0 \quad (2)$$

The inventors believe that the mechanisms whereby the toner charge quantity can be retained while suppressing surface contamination of the toner bearing member in a charge-injection charging system and also preventing an increase in the applied voltage during charge injection are as follows.

First, we look at the parameters governing the electrical characteristics of a conductive toner that can be used in a charge-injection charging system.

The electrical properties of ordinary dielectric materials include relative permittivity, volume resistivity and conductivity, and the electrical characteristics of capacitance, resistance, and conductance (conductivity) are determined from these electrical properties and the geometric shape. Looking at relative permittivity as an electrical property of toner, there is little scope for controlling the relative permittivity by means of the toner materials and preparation conditions. Thus, the toner capacitance Ctn can be controlled by changing the particle diameter of the toner and the material composition of the toner.

Looking at volume resistivity as an electrical property of the toner, this can be controlled within a wide range by for example using a material such as a metal oxide as a conductive filler or charge trap sites and disposing it near the toner surface. In this case, the relative permittivity is controlled much less than the volume resistivity. This means that the volume resistance Rtn of the toner can be controlled within a wide range and the desired conductive toner can be obtained by controlling the part near the toner surface.

However, making the toner conductive also leads to electrostatic energy loss, and it is difficult to achieve both conductivity and charge retention.

The inventors therefore focused on the toner bearing member and the interfacial conductivity phenomena that occur when a toner is combined with a toner bearing member, with reference to the following documents.

According to Iwamoto et al., Journal of the Surface Science Society of Japan, Vol. 29, No. 2, pp. 105-113, "Charge Storage and Carrier Transport at Organic Semiconductor-Insulator Interface", Section 2.1: "Interface charge storage due to Maxwell-Wagner effect" (hereunder called Document A), there is a fundamental law that "charge storage occurs at an interface between two materials with different relaxation times".

The phenomenon of charge storage at the interface (interfacial polarization phenomenon) according to this law is the Max-Wagner effect. This is not dependent on the path by which the stored charge flows into the interface, and occurs whether the charge collects at the interface from within the bulk of the Si semiconductor or flows in from the electrodes.

According to Document A, in a toner bearing member with a 2-layer configuration comprising a conductive elastic layer and a surface layer, an interface with different dielectric relaxations can be formed by controlling the resistance and capacitance of each. Charge (interfacial polarization charge) then accumulates at the interface due to the Maxwell-Wagner effect (interfacial polarization phenomenon). This accumulated charge will be present even when movable ions are present or a current is flowing through the toner bearing member.

At this time, when a reverse electrical field opposite to the field applied to the toner bearing member occurs due to the charge accumulated at the interface (interfacial polarization charge), the field strength inside the bulk of the toner bearing member declines, and volume resistance increases. We also considered the possibility that the current flowing into the toner bearing member could be suppressed.

Furthermore, when the volume resistance Rdr of the toner bearing member is smaller than the volume resistance Rtn of the toner (as shown in formula (2) above), the volume resistance Rdr of the toner bearing member becomes a rate-determining condition for the current flowing through the toner and the toner bearing member.

The surface layer of the toner bearing member induces a charge that is sensitive to the charge (interfacial polarization charge) accumulated at the interface between the surface layer and the conductive elastic layer of the toner bearing member, thereby increasing the surface charge of the toner bearing member in contact with the toner.

Similarly, according to Document A, the same interfacial polarization phenomenon may occur at the interface between the toner and the toner bearing member, increasing the charge quantity of the toner.

The electrical characteristics of a toner bearing member having a 2-layer configuration comprising a conductive elastic layer and a surface layer with different dielectric relaxations are discussed here.

The conductive elastic layer and surface layer constituting the toner bearing member are each assumed to be an electric circuit model of RC parallel circuits connected in a series. The fact that the dielectric relaxations of the layers are different shows that the frequency dependencies of the electrical AC characteristics are different. In general, an analysis method called impedance spectroscopy can be used to separate and identify the elementary processes of the RC parallel circuit model attributable to the conductive elastic layer and the RC parallel circuit model attributable to the surface layer.

Consequently, the fact that the toner bearing member comprises two layers with different dielectric relaxations (which is a necessary condition for the interfacial polarization phenomenon) means that there are two elementary processes that can be distinguished based on the impedance characteristics. Conversely, the more similar the dielectric relaxations, the more difficult it becomes to separate and identify the elementary processes by impedance spectroscopy.

Multiple elementary processes have to be observed in the toner bearing member. The number of elementary processes is preferably two. If the toner bearing member has multiple elementary processes, this indicates that interfacial polarization charge exists at the interface between the conductive elastic layer and the surface layer constituting the toner bearing member.

The difference in dielectric relaxation between the toner and the toner bearing member was expressed using the electrical characteristics of resistance and capacitance, yielding the above relational formulae (1) and (2).

The electrical characteristics of the toner and the toner bearing member are discussed here.

Normally, toner that has passed through the toner regulating member has been adjusted to a toner thickness corresponding to 1.5 times the toner particle diameter, which is the amount of toner necessary for obtaining the desired image density.

For this reason, the electrical characteristics of the toner are converted from the volume resistivity and relative permittivity obtained by impedance measurement and from a parallel plate capacitor model assuming a thickness of 1.5 times the weight-average particle diameter D4 of the toner as obtained by the electrical detection band method.

The capacitance value of the toner per unit area is then defined as Ctn ($pF/cm^2$), and the volume resistance value per unit area is defined as Rtn ($\Omega/cm^2$).

To permit charge injection with a low applied voltage, the toner is a conductive toner that exhibits electrical conductivity under applied voltage equal to or less than the dielectric breakdown field strength of air.

Specifically, it is a toner having a volume resistivity of from $1\times10^{10}$ ($\Omega\cdot cm$) to $1\times10^{14}$ ($\Omega\cdot cm$), a level at which the time constant is reduced because the charge rising performance is improved.

The capacitance value per unit area obtained by impedance measurement of the toner bearing member bearing this toner is defined as Cdr ($pF/cm^2$), and the volume resistance value per unit area is defined as Rdr ($\Omega/cm^2$). The volume resistance value Rdr is from $5.0\times10^5$ $\Omega/cm^2$ to $2.0\times10^8$ $\Omega/cm^2$.

If the volume resistance value Rdr of the toner bearing member is too high, the electrostatic attraction on the surface of the toner bearing member increases because the charge retention function improves. Surface contamination of the toner bearing member becomes more likely as a result, and phenomena such as regulating error may be more likely because a toner layer cannot be formed with a uniform thickness on the toner bearing member.

Consequently, the volume resistance value Rdr per unit area of the toner bearing member has to be not more than $2.0\times10^8$ $\Omega/cm^2$.

If the volume resistance value Rdr of the toner bearing member is too low, on the other hand, the charge retention function due to electrostatic energy loss by the toner bearing member is reduced, and the electrification charge can no longer be retained. Therefore, the volume resistance value Rdr per unit area, at which the electrification charge can be retained, has to be at least $5.0\times10^5$ $\Omega/cm^2$.

The volume resistance value Rdr is preferably from $1.0\times10^7$ $\Omega/cm^2$ to $1.8\times10^8$ $\Omega/cm^2$.

The volume resistance value Rdr can be controlled by controlling the formulations of a conductive coating and a surface layer coating.

The capacitance Cdr per unit area of the toner bearing member has to be from 300 $pF/cm^2$ to 900 $pF/cm^2$. If the Cdr is within this range, the charge rising performance of the toner can be improved.

The capacitance Cdr is preferably from 350 $pF/cm^2$ to 500 $pF/cm^2$. The capacitance Cdr can be controlled by controlling the formulations of the conductive coating and the surface layer coating.

Next, the electrical characteristics (charge rising characteristics) of a toner bearing member with a layer of conductive toner are explained.

The explanations below assume transient response characteristics with step voltage applied (hereunder called "step response characteristics") as an electrical model that produces injection charging when voltage is applied as the toner layered on the toner bearing member passes through the regulating member.

The moment that a voltage Vin is applied between the toner and the toner bearing member, inrush current flows in, the capacitance Ctn of the toner and the capacitance Cdr of the toner bearing member are charged, and the toner voltage Vtn and the toner bearing member voltage Vdr are determined. The toner voltage Vtn then becomes:

$$Vtn=Cdr/(Cdr+Ctn)\times Vin$$

while the toner bearing member voltage Vdr becomes:

$$Vdr=Ctn/(Cdr+Ctn)\times Vin.$$

That is, the toner voltage Vtn and the toner bearing member voltage Vdr immediately after application of voltage Vin are determined by the distribution ratios of the applied voltage Vin according to the respective capacitance ratios of the toner and the toner bearing member.

Thus, the distribution ratio of the toner voltage Vtn relative to the applied voltage Vin can be controlled from 0.6 to 0.8 by keeping the ratio of the capacitance Cdr of the toner bearing member and the capacitance Ctn of the toner (Cdr/Ctn) from 1.5 to 4.5. The charge rising performance of the toner can be improved as a result.

Next, we discuss the step response characteristics of the toner voltage Vtn after voltage Vin has been applied and the distribution ratios of the toner voltage Vtn and toner bearing member voltage Vdr relative to the applied voltage Vin have been determined.

The step response characteristics after the toner voltage Vtn has been determined can be broadly categorized into cases in which the toner voltage Vtn decreases, cases in which there is little change, and cases in which it increases.

These step response characteristics are determined by the time constant ($\tau dr=Rdr\times Cdr$) of the toner bearing member as determined from the volume resistance value Rdr and capacitance Cdr of the toner bearing member, and by the volume resistance value Rtn of the toner and the volume resistance value Rdr of the toner bearing member.

Basically, the toner voltage Vtn converges on Rtn/(Rdr+Rtn)×Vin based on the volume resistance value Rtn of the toner and the volume resistance value Rdr of the toner bearing member.

The conditions under which the toner voltage Vtn does not change are conditions under which the relational expression Cdr/(Cdr+Ctn)=Rtn/(Rdr+Rtn) holds. If this relational formula is expressed in terms of the relational formulae (1) and (2) above, this means that the conditions are such that (Cdr/Ctn)=1/(Rdr/Rtn).

Based on the above relational formula, if (Cdr/Ctn)>1/(Rdr/Rtn) then the toner voltage Vtn decreases, while conversely if (Cdr/Ctn)<1/(Rdr/Rtn) the toner voltage Vtn increases, exhibiting step response characteristics.

Furthermore, the step response characteristics that increase the toner voltage Vtn are attributable to the time constant (τdr=Rdr×Cdr) of the toner bearing member. That is, to improve the charge quantity and charge rising performance of the toner in the electrophotographic process, the time constant τdr of the toner bearing member is more preferably equal to or less than the time taken for the toner to pass through the toner regulating member.

As discussed above, (Cdr/Ctn)≤1/(Rdr/Rtn) is a necessary condition for maintaining and improving the charging characteristics of the toner. As a concrete benchmark, preferably (Cdr/Ctn) in the relational formula (1) is at least 1.0, and (Rdr/Rtn) in the relational formula (2) is not more than 1.0.

Next, we discuss cases in which (Rdr/Rtn) in the relational formula (2) exceeds 1.0, or in other words violates the necessary condition.

Within this range, if the volume resistance value Rdr of the toner bearing member is high, the electrostatic attraction of the toner bearing member increases, and surface contamination becomes more likely. If the volume resistance value Rtn of the toner is low, moreover, the electrification charge quantity of the toner decreases. Consequently, (Rdr/Rtn) has to be not more than 1.0 and is preferably not more than 0.5 considering the charge attenuation characteristics and the like.

Cases in which (Rdr/Rtn) in the relational formula (2) is less than $1.0\times10^{-4}$ are discussed next.

Within this range, if the volume resistance value Rtn of the toner is high, charge-injection charging is not achieved, triboelectric charging dominates, and the toner is liable to charge-up. If the volume resistance value Rdr of the toner bearing member is low, moreover, the charge rising performance of the toner is reduced because the capacitance Cdr of the toner bearing member declines.

(Rdr/Rtn) is preferably at least $1.0\times10^{-3}$.

The main focus of the present disclosure is on controlling the electrical characteristics and achieving both charge injection and charge retention based on the interfacial polarization phenomenon between the toner and the toner bearing member.

At this time, if (Cdr/Ctn) in the relational formula (1) is less than 1.5, the dielectric relaxation characteristics of the toner and toner bearing member cannot be differentiated in relation to (Rdr/Rtn) in the relational formula (2), making it difficult to control the interfacial polarization phenomenon, so that the toner charge quantity declines and it becomes impossible to maintain an adequate charge quantity.

If (Cdr/Ctn) exceeds 4.5, this means that there is a difference in charge retention capacity between the toner and the toner bearing member. As a result, it becomes difficult to maintain charge at the interface where the difference in charge retention ability is high due to reasons such as the tunnel effect, space charge limiting current, and thermionic emission due to the mirror effect. Leak current occurs as a result, and it is difficult to retain a toner charge quantity.

(Cdr/Ctn) is preferably from 1.7 to 3.4.

As discussed above, both toner conductivity and charge retention can be achieved by controlling the interface polarization phenomenon at the internal interface of the toner bearing member and the interface polarization phenomenon at the interface between the toner bearing member and the toner. Because the toner and toner bearing member are conductive, moreover, it is also possible to suppress an increase in the applied voltage during charge injection.

The configuration of the toner used in the developing apparatus is explained in detail below, but the toner is not limited to the following.

The volume resistivity of the toner according to impedance measurement is from $1.0\times10^{10}$ Ω·cm to $1.0\times10^{14}$ Ω·cm.

If the volume resistivity of the toner is within this range, it is possible to both inject charge into the toner and retain the injected charge. If the volume resistivity is less than $1.0\times10^{10}$ λ·cm, charge leakage from the toner is likely even if relational formulae (1) and (2) are satisfied, making it difficult to maintain a charge quantity.

If the volume resistivity exceeds $1.0\times10^{14}$ Ω·cm, on the other hand, the effects of the invention cannot be obtained because there is effectively no charge injection into the toner. The volume resistivity is preferably in the range of from $1.0\times10^{11}$ Ω·cm to $1.0\times10^{14}$ Ω·cm.

The volume resistivity can be controlled by controlling the volume resistivity of a material disposed near the toner surface or inside the toner or the like. Of these, it is preferably controlled by controlling a material disposed near the toner surface because in this case only a small amount of material is required to control the volume resistivity of the toner, and the effect on the toner fixing performance is small.

The relative permittivity of the toner is preferably from 1.50 to 3.00. If the relative permittivity is within this range, the saturated charge quantity of the toner will be within the preferred range. The relative permittivity is more preferably from 1.80 to 2.50.

The relative permittivity can be controlled by controlling the relative permittivity of a material disposed on the toner surface or inside the toner or the like.

The weight-average particle diameter (D4) of the toner is preferably from 3.0 to 10.0 μm, or more preferably from 4.5 to 8.0 μm. If the D4 is within this range, the charge quantity distribution is easier to control, and high-quality images can be obtained because the latent image reproducibility is also excellent.

Moreover, because the capacitance value Ctn per unit area of the toner is determined by the relative permittivity of the toner and the thickness of the toner layer, the relational formula (2) can be easily satisfied by controlling the D4 of the toner in conjunction with the capacitance Cdr per unit area of the toner bearing member.

The toner comprises a toner particle. Preferably a material having a higher conductivity than the toner particle is disposed on the surface of the toner particle. Examples of this material include a fine particle A containing a compound having a metal element (hereunder also called the metal compound particle A). For example, the toner particle preferably comprises the metal compound particle A on its surface.

If the toner particle comprises the metal compound particle A on its surface, a toner satisfying the relational formula (2) can be easily obtained because the volume resistivity of the toner is easy to control. The metal compound constituting the metal compound particle A is not particularly limited, and a conventionally known metal compound may be used.

Specific examples include metal oxides such as titanium oxide, aluminum oxide, tin oxide and zinc oxide, composite oxides such as strontium titanate and barium titanate, and polyvalent acid metal salts such as titanium phosphate, zirconium phosphate and calcium phosphate and the like.

Of these, a metal oxide or polyvalent acid metal salt is preferred for reasons of structural stability and volume resistivity. A polyvalent acid metal salt is more preferred because induced charge due to potential difference is more likely to occur if an appropriate polarized structure is present, and because more efficient injection charging is possible if the charge transfer is smooth due to network structures in the molecule. That is, the toner particle preferably comprises a polyvalent acid metal salt on its surface. When the toner particle comprises a shell on its surface, the polyvalent acid metal salt is preferably present on the surface of the shell.

The metal element is not particularly limited, and a conventionally known metal element may be used.

The metal compound particle A preferably contains at least one metal element selected from the group consisting of the metal elements belonging to groups 3 to 13. Because metal compounds containing metal elements belonging to groups 3 to 13 tend to have low water absorption, the charge injection and charge retention are less dependent on humidity, increasing the stability in different use environments.

The Pauling electronegativity of the metal element is preferably from 1.25 to 1.80, or more preferably from 1.30 to 1.70. If the electronegativity of the metal element is within this range, moderate polarization occurs in the metal parts and non-metal parts within the metal compound, allowing for to more efficient injection charging.

The values described in the Chemical Society of Japan's (2004) "Chemistry Handbook Basic Edition", Revised $5^{th}$ Edition, front and back cover, Maruzen Pub. are used for Pauling electronegativity.

Specific examples of such metal elements include titanium (group 4, electronegativity 1.54), zirconium (group 4, 1.33), aluminum (group 13, 1.61), zinc (group 12, 1.65), indium (group 13, 1.78) and hafnium (group 4, 1.30).

Of these, a metal that can have a valence of at least 3 is preferred, at least one selected from the group consisting of titanium, zirconium and aluminum is more preferred, and titanium is especially preferred.

When a polyvalent acid metal salt is used as the metal compound, the above metal elements may be used by preference as the metal element. The polyvalent acid is not particularly limited, and a conventionally known polyvalent acid may be used.

The polyvalent acid preferably comprises an inorganic acid. Because inorganic acids have more rigid skeletons than organic acids, their properties change less during long-term storage. It is thus possible to obtain stable injection charging performance even after long-term storage.

Specific examples of polyvalent acids include inorganic acids such as phosphoric acid (trivalent), carbonic acid (divalent) and sulfuric acid (divalent) and organic acids such as dicarboxylic acids (divalent) and tricarboxylic acids (trivalent).

Specific examples of organic acids include dicarboxylic acids such as oxalic acid, malonic acid, succinic acid, glutaric acid, adipic acid, fumaric acid, maleic acid, pimelic acid, suberic acid, azelaic acid, sebacic acid, phthalic acid, isophthalic acid and terephthalic acid, and tricarboxylic acids such as citric acid, aconitic acid and trimellitic anhydride and the like.

Of these, at least one selected from the group consisting of the inorganic acids phosphoric acid, carbonic acid and sulfuric acid is preferred, and phosphoric acid is especially preferred.

Specific examples of polyvalent acid metal salts combining such metal elements and polyvalent acids include phosphoric acid metal salts such as titanium phosphate compounds, zirconium phosphate compounds, aluminum phosphate compounds and copper phosphate compounds; sulfuric acid metal salts such as titanium sulfate compounds, zirconium sulfate compounds and aluminum sulfate compounds; carbonic acid metal salts such as titanium carbonate compounds, zirconium carbonate compounds and aluminum carbonate compounds; and oxalic acid metal salts such as titanium oxalate compounds and the like.

Of these, the polyvalent acid metal salt preferably comprises a phosphoric acid metal salt and more preferably contains a titanium phosphate compound because high strength is obtained by crosslinking of phosphate ions between metals, and the charge rising performance is also excellent due to the ionic bonds in the molecule.

The method for obtaining the polyvalent acid metal salt is not particularly limited, and a known method may be used. A method of reacting a polyvalent acid ion with a metal compound as a metal source in an aqueous medium to obtain the polyvalent acid metal salt is preferred.

Any known metal compound may be used as the metal source without particular limitations as long as it is a metal compound that yields a polyvalent acid metal salt through a reaction with a polyvalent acid ion.

Specific examples include metal chelates such as titanium lactate, titanium tetraacetyl acetonate, titanium lactate ammonium salt, titanium triethanol aminate, zirconium lactate, zirconium lactate ammonium salt, aluminum lactate, aluminum trisacetyl acetonate and copper lactate; and metal alkoxides such as titanium tetraisopropoxide, titanium ethoxide, zirconium tetraisopropoxide and aluminum trisisopropoxide and the like.

Of these, a metal chelate is preferred for ease of controlling the reaction and reacting quantitatively with the polyvalent acid ion. A lactic acid chelate such as titanium lactate or zirconium lactate is more preferred from the standpoint of solubility in the aqueous medium.

Ions of the aforementioned polyvalent acids may be used as the polyvalent acid ion. When added to the aqueous medium, the polyvalent acid may be added as is, or in the form of a water-soluble polyvalent acid metal salt that is added to the aqueous medium and dissociated in the aqueous medium.

The content of the polyvalent acid metal salt in the toner particle is preferably from 0.01 mass % to 5.00 mass %, or more preferably from 0.02 mass % to 3.00 mass %, or still more preferably from 0.05 mass % to 2.00 mass %.

The toner particle preferably comprises an organosilicon polymer on a surface thereof. That is, the toner particle preferably comprises a toner base particle and an organosilicon polymer on the surface of the toner base particle. The organosilicon polymer is preferably an organosilicon condensate.

By providing an organosilicon polymer on the toner particle surface, it is possible to reduce the difference in work functions between the toner and the toner bearing member when the toner is combined with a toner bearing member having an organosilicon polymer as discussed below. It is thus possible to suppress charge transfer due to triboelectric charging between the toner and the toner bearing member and maintain a sharp charge quantity distribution from injection charging.

In a normal triboelectric system, the toner is charged by friction between the toner and the toner bearing member. Triboelectric charging is commonly facilitated by increasing the difference in work function between the toner and the toner bearing member. In an injection charging system, on the other hand, it is desirable to minimize the effect of triboelectric charging because this yields a sharper charge quantity distribution in comparison with triboelectric charging.

The organosilicon polymer on the toner particle surface preferably forms a shell. The toner particle preferably comprises a toner base particle and a shell of the organosilicon polymer on the surface of the toner base particle. With such a shell, changes in the performance of the toner bearing member can be suppressed because movement of fine particles to the toner bearing member is suppressed in comparison with a toner having normal silica fine particles or the like. It is thus possible to obtain a developing apparatus that exhibits good long-term injection charging performance.

A known organosilicon polymer may be used as the organosilicon polymer, without any particular limitations. Of these, it is desirable to use an organosilicon polymer having a structure represented by the following formula (I):

$$R—SiO_{3/2} \qquad (I)$$

In formula (I), R represents a (preferably $C_{1-8}$, or more preferably $C_{1-6}$) alkyl group, a (preferably $C_{1-6}$, or more preferably $C_{1-4}$) alkenyl group, a (preferably $C_{1-6}$, or more preferably $C_{1-4}$) acyl group, a (preferably $C_{6-14}$, or more preferably $C_{6-10}$) aryl group, or a methacryloxyalkyl group.

Formula (I) represents the organosilicon polymer as having an organic group and a silicon polymer part. This means that in an organosilicon polymer containing the structure represented by formula (I), the organic group affixes strongly to the toner base particle because it has affinity for the toner base particle, while the silicon polymer part affixes strongly to the metal compound particle A because it has affinity for the metal compound. Thus, the metal compound particle A can be fixed more strongly to the toner base particle because the organosilicon polymer has the function of fixing the toner particle and the metal compound particle A together.

Formula (I) also represents the organosilicon polymer as being crosslinked. Because the organosilicon polymer has crosslinked structures, the strength of the organosilicon polymer is increased, and hydrophobicity is also increased because there are fewer residual silanol groups. It is thus possible to obtain a highly durable toner that exhibits stable performance even in high-humidity environments.

R in formula (I) is preferably a $C_{1-6}$ alkyl group such as a methyl group, propyl group or normal hexyl group, or a vinyl group, phenyl group or methacryloxypropyl group, and is more preferably a $C_{1-6}$ alkyl group or a vinyl group. An organosilicon polymer having such a structure has both hardness and flexibility because the molecular mobility of the organic groups is controlled, and therefore exhibits excellent performance with little toner deterioration even after long-term use.

A known organosilicon compound may be used as the organosilicon compound for obtaining the organosilicon polymer, with no particular limitations. Of these, at least one selected from the group consisting of the organosilicon polymers represented by formula (II) below is preferred.

$$R—Si—Ra_3 \qquad (II)$$

Each Ra in formula (II) independently represents a halogen atom or a (preferably $C_{1-4}$, or more preferably $C_{1-3}$) alkoxy group. Each R independently represents a (preferably $C_{1-8}$, or more preferably $C_{1-6}$) alkyl group, a (preferably $C_{1-6}$, or more preferably $C_{1-4}$) alkenyl group, a (preferably $C_{6-14}$, or more preferably $C_{6-10}$) aryl group, a (preferably $C_{1-6}$, or more preferably $C_{1-4}$) acyl group, or a methacryloxyalkyl group.

Specific examples of the silane compound represented by formula (II) include trifunctional silane compounds, including trifunctional methyl silane compounds such as methyl trimethoxysilane, methyl triethoxysilane, methyl diethoxymethoxy silane and methyl ethoxydimethoxy silane; trifunctional silane compounds such as ethyl trimethoxysilane, ethyl triethoxysilane, propyl trimethoxysilane, propyl triethoxysilane, butyl trimethoxysilane, butyl triethoxysilane, hexyl trimethoxysilane and hexyl triethoxysilane; trifunctional phenyl silane compounds such as phenyl trimethoxysilane and phenyl triethoxysilane; trifunctional vinyl silane compounds such as vinyl trimethoxysilane and vinyl triethoxysilane; trifunctional allyl silane compounds such as allyl trimethoxysilane, allyl triethoxysilane, allyl diethoxymethoxy silane and allyl ethoxydimethoxy silane; and γ-methacryloxypropyl silane compounds such as γ-methacryloxypropyl trimethoxysilane, γ-methacryloxypropyl triethoxysilane, γ-methacryloxypropyl diethoxymethoxy silane, and γ-methacryloxypropyl ethoxydimethoxy silane and the like.

R in formula (II) is preferably a $C_{1-6}$ alkyl group such as a methyl group, propyl group or normal hexyl group, or a vinyl group, phenyl group or methacryloxypropyl group, and is more preferably a $C_{1-6}$ alkyl group or vinyl group. It is thus possible to obtain an organosilicon polymer that satisfies the preferred range of formula (I) above.

Ra is preferably an alkoxy group because it is then possible to obtain a stable organosilicon polymer due to the suitable reactivity in the aqueous medium. Ra is more preferably a methoxy group or ethoxy group.

The toner particle preferably comprises a toner base particle. The toner base particle preferably comprises a binder resin.

The toner base particle may be used as is as a toner particle, or a shell containing an organosilicon condensate may be formed on the surface of the toner base particle to obtain a toner particle. The toner particle may also be used as is as a toner, or a toner may be obtained by providing an external additive such as a fine particle on the surface of the toner particle.

A known resin may be used for the binder resin, without any particular limitations. Specific examples include vinyl resins, polyester resins, polyurethane resins, polyamide resins and the like. The binder resin preferably contains a vinyl resin.

Examples of polymerizable monomers that can be used for manufacturing the vinyl resin include styrene monomers such as styrene and alpha-methylstyrene; acrylic acid esters such as methyl acrylate and butyl acrylate; methacrylic acid esters such as methyl methacrylate, 2-hydroxyethyl methacrylate, t-butyl methacrylate and 2-ethylhexyl methacrylate; unsaturated carboxylic acids such as acrylic acid and methacrylic acid; unsaturated dicarboxylic acids such as maleic acid; unsaturated dicarboxylic acid anhydrides such as maleic anhydride; nitrile vinyl monomers such as acrylonitrile; halogen-containing vinyl monomers such as vinyl chloride; and nitro vinyl monomers such as nitrostyrene and the like.

The glass transition temperature (Tg) of the binder resin is preferably from 40° C. to 70° C., or more preferably from 40° C. to 60° C.

The toner base particle may comprise a colorant. Known pigments and dyes of various colors including black, yellow, magenta, and cyan as well as other colors and magnetic bodies and the like may be used as the colorant, without any particular limitations.

Examples of black colorants include black pigments such as carbon black.

Examples of yellow colorants include yellow pigments and yellow dyes, including monoazo compounds, disazo compounds, condensed azo compounds, isoindolinone compounds, benzimidazolone compounds, anthraquinone compounds, azo metal complexes, methine compounds, and allylamide compounds. Specific examples include C.I. pigment yellow 74, 93, 95, 109, 111, 128, 155, 174, 180 and 185 and C.I. solvent yellow 162.

Examples of magenta colorants include magenta pigments and magenta dyes, including monoazo compounds, condensed azo compounds, diketopyrrolopyrrole compounds, anthraquinone compounds, quinacridone compounds, basic dye lake compounds, naphthol compounds, benzimidazolone compounds, thioindigo compounds and perylene compounds.

Specific examples include C.I. pigment red 2, 3, 5, 6, 7, 23, 48:2, 48:3, 48:4, 57:1, 81:1, 122, 144, 146, 150, 166, 169, 177, 184, 185, 202, 206, 220, 221, 238, 254 and 269 and C.I. pigment violet 19 and the like.

Examples of cyan colorants include cyan pigments and cyan dyes, including copper phthalocyanine compounds and their derivatives, anthraquinone compounds, basic dye lake compounds and the like.

Specific examples include C.I. pigment blue 1, 7, 15, 15:1, 15:2, 15:3, 15:4, 60, 62, 66 and the like.

The content of the colorant is preferably from 1.0 to 20.0 mass parts per 100.0 mass parts of the binder resin or polymerizable monomer.

A magnetic material may also be comprised in the toner to make a magnetic toner. In this case, the magnetic material can serve as a colorant.

Examples of the magnetic material include iron oxides such as magnetite, hematite, and ferrite; metals such as iron, cobalt and nickel, alloys of these metals with other metals such as aluminum, cobalt, copper, lead, magnesium, tin, zinc, antimony, beryllium, bismuth, cadmium, calcium, manganese, selenium, titanium, tungsten and vanadium, and mixtures of these and the like.

The toner base particle may also contain a plasticizer. The plasticizer is not particularly limited, and a known plasticizer or the like may be used.

Specific examples include esters of monohydric alcohols and aliphatic carboxylic acids or esters of monovalent carboxylic acids and aliphatic alcohols, such as behenyl behenate, stearyl stearate and palmityl palmitate; esters of dihydric alcohols and aliphatic carboxylic acids or esters of divalent carboxylic acids and aliphatic alcohols, such as ethylene glycol distearate, dibehenyl sebacate, and hexanediol dibehenate; esters of trihydric alcohols and aliphatic carboxylic acids or esters of trivalent carboxylic acids and aliphatic alcohols, such as glycerin tribehenate; esters of tetrahydric alcohols and aliphatic carboxylic acids or esters of tetravalent carboxylic acids and aliphatic alcohols, such as pentaerythritol tetrastearate and pentaerythritol tetrapalmitate; esters of hexahydric alcohols and aliphatic carboxylic acids or esters of hexavalent carboxylic acids and aliphatic alcohols, such as dipentaerythritol hexastearate and dipentaerythritol hexapalmitate; esters of polyhydric alcohols and aliphatic carboxylic acids or esters of polyvalent carboxylic acids and aliphatic alcohols, such as polyglycerin behenate; and natural waxes such as carnauba wax and rice wax. These may be used individually or combined.

The content of the plasticizer is preferably from 1.0 to 50.0 mass parts, or more preferably from 5.0 to 30.0 mass parts per 100.0 mass parts of the binder resin or polymerizable monomer.

The toner base particle may also contain a release agent. A known wax may be used as the release agent, without any particular limitations.

Specific examples include petroleum-based waxes such as paraffin wax, microcrystalline wax and petrolactam, and their derivatives, montan wax and its derivatives, hydrocarbon waxes obtained by the Fischer-Tropsch method, and their derivatives, polyolefin waxes such as polyethylene, and their derivatives, and natural waxes such as carnauba wax and candelilla wax and their derivatives and the like.

These derivatives include oxides and block copolymers with vinyl monomers, as well as graft modified products.

Other examples include alcohols such as higher fatty alcohols; fatty acids such as stearic acid and palmitic acid, and their acid amides, esters and ketones; and hydrogenated castor oil and its derivatives, plant waxes, animal waxes and the like. These may be used individually or combined.

Of these, using a polyolefin, a Fischer-Tropsch hydrocarbon wax or a petroleum wax is desirable for improving the developing performance and transferability. Antioxidants may also be added to these waxes to the extent that this does not detract from the above effects.

The content of the release agent is preferably from 1.0 to 30.0 mass parts per 100.0 mass parts of the binder resin or polymerizable monomer.

The melting point of the release agent is preferably from 30° C. to 120° C., or more preferably from 60° C. to 100° C.

Using a release agent that exhibits these thermal properties, the release effect is efficiently expressed, and a wider fixing range is ensured.

The toner base particle may also contain a charge control agent. A known charge control agent may be used without any particular limitations.

Specific examples of negative charge control agents include metal compounds of aromatic carboxylic acids such as salicylic acid, alkylsalicylic acid, dialkylsalicylic acid, naphthoic acid and dicarboxylic acid, and polymers or copolymers having such metal compounds of aromatic carboxylic acids; polymers or copolymers having sulfonic acid groups, sulfonic acid bases or sulfonic acid ester groups; metal salts or metal complexes of azo dyes or azo pigments; and boron compounds, silicon compounds, calixarenes and the like.

Examples of positive charge control agents include quaternary ammonium salts and high-molecular-weight compounds having quaternary ammonium salts in the side chains; and guanidine compounds, nigrosine compounds, imidazole compounds and the like. Homopolymers of sulfonic acid group-containing vinyl monomers such as styrene sulfonic acid, 2-acrylamido-2-methylopropane sulfonic acid, 2-methacrylamido-2-methylpropane sulfonic acid, vinyl sulfonic acid and methacryl sulfonic acid, or copolymers of the vinyl monomers listed under the binder resin with these sulfonic acid group-containing vinyl monomers, may also be used as polymers or copolymers having sulfonic acid bases or sulfonic acid ester groups.

The content of the charge control agent is preferably from 0.01 to 5.0 mass parts per 100.0 mass parts of the binder resin or polymerizable monomer.

The toner may also contain a known external additive, without any particular limitations.

Specific examples include active silica fine particles such as wet silica and dry silica or silica fine particles obtaining by treating such active silica fine particles with treatment agents such as silane coupling agents, titanium coupling agents and silicone oil; and resin fine particles such as vinylidene fluoride fine particles and polytetrafluoroethylene fine particles.

The content of the external additive is preferably from 0.1 to 5.0 mass parts per 100.0 mass parts of the toner particle.

An example of a method for obtaining the toner particle is given below, but the method is not limited thereby.

A known method may be used for forming a shell containing the organosilicon polymer on the surface of the toner base particle, with no particular limitations. Of these, a method of forming the shell on the toner base particle by condensing an organosilicon compound in an aqueous medium containing the dispersed toner base particle is preferred because it can fix the shell strongly to the toner base particle.

This method is explained here.

When forming the shell on the toner base particle by this method, it is desirable to include a step of obtaining a toner base particle dispersion that the toner base particle is dispersed in an aqueous medium (Step 1), and a step of mixing an organosilicon compound (and/or a hydrolysate thereof) with the toner base particle dispersion and performing a condensation reaction of the organosilicon compound in the toner base particle dispersion to thereby form a shell containing the organosilicon polymer on the toner base particle (Step 2).

In the Step 1, the method for obtaining the toner base particle dispersion may be a method in which a dispersion of a toner base particle manufactured in an aqueous medium is used as is, or a method in which the dried toner base particle is added to an aqueous medium and mechanically dispersed. A dispersion aid may also be used when dispersing the dried toner base particle in the aqueous medium.

A known dispersion stabilizer, surfactant or the like may be used as the dispersion aid.

Specific examples of dispersion stabilizers include inorganic dispersion stabilizers such as tricalcium phosphate, hydroxyapatite, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica and alumina; and organic dispersion stabilizers such as polyvinyl alcohol, gelatin, methyl cellulose, methyl hydroxypropyl cellulose, ethyl cellulose, carboxymethyl cellulose sodium salt, and starch.

Examples of surfactants include anionic surfactants such as alkyl sulfate ester salts, alkyl benzenesulfonate salts and fatty acid salts; nonionic surfactants such as polyoxyethylene alkyl ether and polyoxypropylene alkyl ether; and cationic surfactants such as alkyl amine salts and quaternary ammonium salts.

Of these, it is desirable to include an inorganic dispersion stabilizer, and more desirable to include dispersion stabilizer containing a phosphate salt such as tricalcium phosphate, hydroxyapatite, magnesium phosphate, zinc phosphate or aluminum phosphate.

In the Step 2, the organosilicon compound may be added as is to the toner base particle dispersion or may be hydrolyzed before being added to the toner base particle dispersion. It is preferably added after being hydrolyzed because this makes the condensation reaction easier to control and reduces the amount of the organosilicon compound remaining in the toner base particle dispersion.

Hydrolysis is preferably performed in an aqueous medium the pH of which has been adjusted with a known acid and base. Hydrolysis of organosilicon compounds is known to be pH dependent, and the pH for performing this hydrolysis is preferably changed appropriately according to the type of organosilicon compound. When methyl triethoxysilane is used as the organosilicon compound for example, the pH of the aqueous medium is preferably from 2.0 to 6.0.

Specific examples of acids for pH adjustment include inorganic acids such as hydrochloric acid, hydrobromic acid, hydroiodic acid, hypochlorous acid, chlorous acid, chloric acid, perchloric acid, hypobromous acid, bromous acid, bromic acid, perbromic acid, hypoiodous acid, iodous acid, iodic acid, periodic acid, sulfuric acid, nitric acid, phosphoric acid and boric acid; and organic acids such as acetic acid, citric acid, formic acid, gluconic acid, lactic acid, oxalic acid and tartaric acid.

Specific examples of bases for pH adjustment include alkali metal hydroxides such as potassium hydroxide, sodium hydroxide and lithium hydroxides, and aqueous solutions of these; alkali metal carbonates such as potassium carbonate, sodium carbonate and lithium carbonate, and aqueous solutions of these; alkali metal sulfates such as potassium sulfate, sodium sulfate and lithium sulfate, and aqueous solutions of these; alkali metal phosphates such as potassium phosphate, sodium phosphate and lithium phosphate, and aqueous solutions of these; alkali earth metal hydroxides such as calcium hydroxide and magnesium hydroxide, and aqueous solutions of these; ammonia; and amines such as triethylamine and the like.

The condensation reaction in the Step 2 is preferably controlled by adjusting the pH of the toner base particle dispersion. Condensation reactions of organosilicon compounds are known to be pH dependent, and the pH for performing the condensation reaction is preferably changed appropriately according to the type of organosilicon compound. When methyl triethoxysilane is used as the organosilicon compound for example, the pH of the aqueous medium is preferably from 6.0 to 12.0.

The method for causing the metal compound fine particle A to be present on the toner particle surface is not particularly limited, but examples include the following methods.

For example, cases in which a polyvalent acid metal salt is used as the metal compound fine particle A are explained.

(1) A method of reacting a polyvalent acid ion with a metal compound as a metal source to obtain the polyvalent acid metal salt in an aqueous medium containing the dispersed toner particle.

(2) A method of chemically attaching a polyvalent acid metal salt fine particle to the toner particle in an aqueous medium containing the dispersed toner particle.

(3) A method of mechanically applying external force to attach a polyvalent acid metal salt fine particle to the toner particle in a wet or dry system.

Of these, the method of reacting a polyvalent acid ion with a metal compound as a metal source to obtain the polyvalent acid metal salt in an aqueous medium containing the dispersed toner particle is preferred.

Using this method, the polyvalent acid metal salt can be uniformly dispersed on the toner particle surface. Conductive paths are formed efficiently as a result, and a toner exhibiting injection charging properties can be obtained with a smaller quantity of the polyvalent acid metal salt.

When the shell contains the metal compound fine particle A, on the other hand, the method for causing the metal compound fine particle A to be present on the surface of the shell is not particularly limited but may be the following method for example.

For example, cases in which a polyvalent acid metal salt is used as the metal compound fine particle A are explained.

When reacting a polyvalent acid ion with a metal compound as a metal source in an aqueous medium containing the dispersed toner particle, the organosilicon compound is added to the aqueous medium at the same time, and the condensation reaction of the organosilicon compound is performed in the same aqueous medium. As a result, the shell contains the organosilicon polymer and the metal compound fine particle A, and the metal compound fine particle A is also present on the surface of the shell.

That is, it is desirable to first form a shell containing the organosilicon polymer on the toner base particle surface by the above methods, and then react the metal compound and the polyvalent acid ion in the aqueous medium containing the dispersed toner particle having the shell while simultaneously condensing the organosilicon compound.

Using this method, the dispersibility of the polyvalent acid metal salt can be increased because the fine particles of the polyvalent acid metal salt generated in the aqueous medium are fixed to the shell surface by the organosilicon polymer before they can grow in the aqueous medium. Furthermore, because the polyvalent acid metal salt is tightly fixed to the shell surface by the organosilicon polymer, it is possible to obtain a highly durable toner that can provide stable injection charging performance even during long-term use.

The metal compound, polyvalent acid and organosilicon compound described above may be used as the metal compound, polyvalent acid and organosilicon compound used in this method, respectively.

The method for manufacturing the toner base particle is not particularly limited, and may be a suspension polymerization method, dissolution suspension method, emulsion aggregation method, pulverization method or the like. Of these, a suspension polymerization method, dissolution suspension method or emulsion aggregation method is preferred for easily controlling the average circularity of the toner within a suitable range.

As one example, a method for obtaining the toner base particle by a suspension polymerization method is described below.

First, a polymerizable monomer for producing the binder resin is mixed with various additives and necessary, and these materials are dissolved or dispersed with a disperser to prepare a polymerizable monomer composition.

Examples of the various additives include a colorant, a release agent, a plasticizer, a charge control agent, a polymerization initiator, a chain transfer agent, and the like.

The disperser may be a homogenizer, ball mill, colloid mill, ultrasound disperser or the like.

Next, the polymerizable monomer composition is added to an aqueous medium containing a poorly water-soluble inorganic fine particle, and a high-speed disperser such as a high-speed stirring apparatus or ultrasound disperser is used to prepare droplets of the polymerizable monomer composition (granulation step).

The polymerizable monomer in the droplets is then polymerized to obtain a toner base particle (polymerization step).

A polymerization initiator may be mixed in when preparing the polymerizable monomer composition or may be mixed into the polymerizable monomer composition immediately before the droplets are formed in the aqueous medium.

It may also be dissolved in the polymerizable monomer or another solvent as necessary and added in a dissolved state either during droplet granulation or after completion of granulation, or in other words immediately before the start of the polymerization reaction.

After the binder resin has been obtained by polymerizing the polymerizable monomer, solvent removal treatment may be performed as necessary to obtain a dispersion of the toner base particle.

When the binder resin is obtained by an emulsion aggregation method, suspension polymerization method or the like, a conventional known monomer may be used as the polymerizable monomer, without any particular limitations. Specific examples include the vinyl monomers listed in the section on the binder resin.

A known polymerization initiator may be used as the polymerization initiator, without any particular limitations.

Specific examples include peroxide polymerization initiators such as hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethyl benzoyl peroxide, lauroyl peroxide, ammonium peroxide, sodium peroxide, potassium peroxide, diisopropyl peroxycarbonate, tetralin hydroperoxide, 1-phenyl-2-methylpropyl-1-hydroperoxide, tert-hydroperoxide pertriphenylacetate, tert-butyl performate, tert-butyl peracetate, tert-butyl perbenzoate, tert-butyl perphenylacetate, tert-butyl permethoxyacetate, tert-butyl benzoylperoxide per-N-(3-toluyl) palmitate, t-butylperoxy-2-ethylhexanoate, t-butyl peroxypivalate, t-butyl peroxiisobutyrate, t-butyl peroxyneodecanoate, methyl ethyl ketone peroxide, diisopropyl peroxycarbonate, cumene hydroperoxide, 2,4-dichlorobenzoyl peroxide and lauroyl peroxide; and azo or diazo polymerization initiators such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile and azobis isobutyronitrile and the like.

Toner Carrying Member (Developing Roller)

The reference symbols in the figures are as follows.

Figure 2:
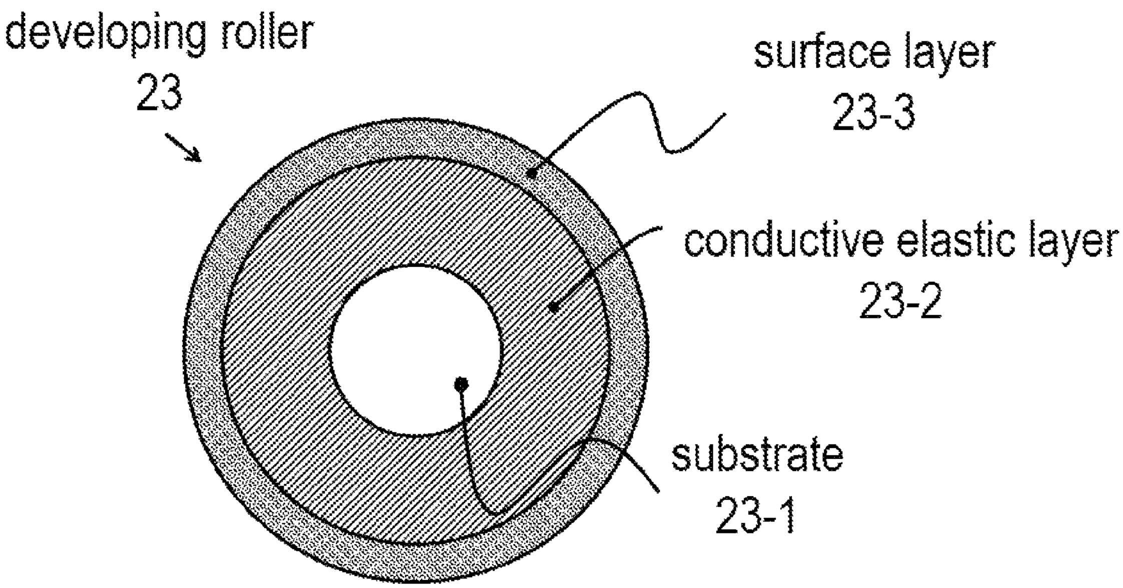
FIG. 2 is an example of a cross-section of a developing roller.

10: process cartridge; 11: photosensitive drum; 12: charging roller; 20: developing apparatus; 21: developer container; 23: developing roller; 23-1: substrate; 23-2: conductive elastic layer; 23-3: surface layer; 24: scraping roller; 25: regulating blade; 26: toner holder; 27: toner leak prevention sheet; T: toner As shown in FIG. 2, the developing roller 23 used as the toner bearing member has a cylindrical or hollow cylindrical substrate 23-1 and a conductive elastic layer 23-2. A surface layer 23-3 is also provided on the conductive elastic layer 23-2 to adjust the electrical characteristics. The surface layer 23-3 may also be omitted.

The substrate 23-1 is conductive and has the function of supporting the conductive elastic layer provided on the substrate. The material may be a metal such as iron, copper, aluminum or nickel, or an alloy such as stainless steel, duralumin, brass, or bronze containing these metals or the like.

The surface of the substrate may be plated to confer scratch resistance as long as this does not detract from the conductivity. It is also possible to use a substrate comprising a metal coated on the surface of a resin substrate to confer surface conductivity, or one that has been manufactured from a conductive resin composition.

The conductive elastic layer 23-2 has a single-layer structure or a laminate structure of two or more layers. In the case of a non-magnetic one-component development process in particular, an electrophotographic member having a 2-layer conductive elastic layer is preferred as the developing roller.

The conductive elastic layer comprises an elastic material such as a resin, rubber, or the like. Specific examples of resins and rubbers include polyurethane resin, polyamide, urea resin, polyimide, melamine resin, fluorine resin, phenol resin, alkyd resin, silicone resin, polyester, ethylene-propylene-diene copolymer rubber (EPDM), acrylic nitrile-butadiene rubber (NBR), chloroprene rubber (CR), natural rubber (NR), isoprene rubber (IR), styrene-butadiene rubber (SBR), fluorine rubber, silicone rubber, epichlorohydrin rubber, hydrated NBR, and urethane rubber.

Of these, a silicone rubber is preferred. Examples of silicone rubbers include polydimethyl siloxane, polymethyl trifluoropropyl siloxane, polymethyl vinyl siloxane, polyphenyl vinyl siloxane, and copolymers of these siloxanes.

One kind alone or a combination of two or more kinds of these resins and rubbers may be used as necessary.

In the case of a 2-layer conductive elastic layer, the conductive elastic layer preferably has a conductive layer such as a conductive resin layer formed on an elastic layer made of an elastic material such as those described above. The above resin materials may be used in the conductive layer. Of these, a polyurethane resin is preferred because it provides excellent triboelectric charging performance to the toner, as well as more opportunities for the contact with the toner due to its excellent flexibility, and because it is also abrasion resistant. The material of the resin or rubber can be identified by measuring the conductive elastic layer with a Fourier transform infrared spectrophotometer.

Examples of polyurethane resins include ether polyurethane resins, ester polyurethane resins, acrylic polyurethane resins and carbonate polyurethane resins. Of these, a polyether polyurethane resin is preferred because it can easily provide flexibility as well as conferring a negative charge on the toner through friction with the toner.

The polyether polyurethane resin may be obtained by a reaction between a known polyether polyol and an isocyanate compound. Examples of polyether polyols include polyethylene glycol, polypropylene glycol and polytetramethylene glycol.

These polyol components can also be converted in advance to chain-extended prepolymers using an isocyanate such as 2,4-tolylene diisocyanate, 2,6-tolylene diisocyanate (TDI), diphenylmethane diisocyanate (MDI) or isophorone diisocyanate (IPDI) as necessary.

The isocyanate compound reacted with these polyol components is not particularly limited, but examples include aliphatic polyisocyanates such as ethylene diisocyanate and 1,6-hexamethylene diisocyanate (HDI); alicyclic polyisocyanates such as isophorone diisocyanate (IPDI), cyclohexane 1,3-diisocyanate and cyclohexane 1,4-diisocyanate; aromatic polyisocyanates such as 2,4-tolylene diisocyanate, 2,6-tolylene diisocyanate (TDI) and diphenylmethane diisocyanate (MDI); and modified products, copolymers, and block forms of these and the like.

The conductive elastic layer 23-2 preferably comprises a conductive agent to obtain conductivity. Examples of conductive agents include ion conductive agents and electron conductive agents such as carbon black. Normally, the volume resistivity of the conductive elastic layer is preferably in the range of from $10^3$ Ω·cm to $10^{11}$ Ω·cm.

Specific examples of the carbon black include conductive carbon blacks such as acetylene black and Ketjen Black™ (Lion Specialty Chemicals Co., Ltd.), as well as carbon blacks for rubber, such as SAF, ISAF, HAF, FEF, GPF, SRF, FT and MT. Other examples include pyrolysis carbon black and oxidized carbon blacks used in color inks.

The added amount of the carbon black is preferably from 5 to 50 mass parts per 100 mass parts of the resin or rubber. The content of the carbon black in the conductive elastic layer can be measured with a thermogravimetric analyzer (TGA).

Apart from the above carbon black, the following conductive aids may also be used: graphite such as natural graphite and artificial graphite; metal powders such as copper, nickel, iron and aluminum powders; metal oxide powders such as titanium oxide, zinc oxide and tin oxide powders; and conductive polymers such as polyaniline, polypyrrole and polyacetylene. One of these alone or a combination of two or more may be used as necessary.

A charge control agent, lubricant, filler, antioxidant, preservative or the like may be included in the conductive elastic layer 23-2 to the extent that this does not impede the functions of the resin or rubber and the conductive aid.

The thickness of the conductive elastic layer 23-2 is preferably from 1 μm to 5 mm and can be determined by observing and measuring a cross-section under an optical microscope.

If surface roughness is required when using an electrophotographic member as a developing roller, a fine particle for roughness control may be included in the conductive elastic layer. The volume-average particle diameter of the fine particle for roughness control is preferably from 3 μm to 20 μm. The amount of the fine particle contained in the conductive elastic layer is preferably from 1 to 50 mass parts per 100 mass parts of the resin or rubber.

A fine particle of a polyurethane resin, polyester resin, polyether resin, polyamide resin, acrylic resin, polycarbonate resin or the like may be used as the fine particle for roughness control.

The developing roller preferably has a surface layer 23-3 on the conductive elastic layer 23-2 for purposes of adjusting the electrical characteristics.

An insulating material is preferably used for the surface layer, and a polysiloxane is preferably used as the insulating material. The polysiloxane can be formed by a sol-gel method from an alkoxysilane raw material. Examples of alkoxysilanes that can be used include tetralkoxysilanes, trialkoxysilanes and dialkoxysilanes.

In particular, the toner bearing member preferably has a surface layer containing an organosilicon polymer on its outermost surface. Either the organosilicon compound used in the toner described above or one of the following silane compounds may be used for the organosilicon polymer.

Specific examples of tetralkoxysilanes include tetramethoxysilane, tetraethoxysilane, tetra(n-propoxy)silane, tetra (iso-propoxy)silane, tetra(n-butyoxy)silane, tetra(2-butoxy) silane and tetra(t-butoxy)silane.

Specific examples of trialkoxysilanes include trimethoxysilanes such as trimethoxyhydrosilane, trimethoxymethylsilane, trimethoxyethylsilane, trimethoxy (n-propyl)silane, trimethoxy (iso-propoxy)silane, trimethoxy (n-butoxy)silane, trimethoxy (2-butoxy)silane, trimethoxy (t-butoxy)silane, trimethoxy (n-hexyl)silane, trimethoxy (n-octyl)silane, trimethoxy (n-decyl)silane, trimethoxy(n-dodeca)silane, trimethoxy (n-tetradeca)silane, trimethoxy (n-pentadeca)silane, trimethoxy (n-hexadeca)silane, trimethoxy (n-octadeca)silane, trimethoxy cyclohexylsilane, trimethoxyphenylsilane and trimethoxy (3-glycidylpropyl)silane, and triethoxysilanes such as triethoxyhydrosilane, triethoxymethylsilane, triethoxyethylsilane, triethoxy (n-propyl)silane, triethoxy (iso-propoxy)silane, triethoxy (n-butoxy)silane, triethoxy (2-butoxy)silane, triethoxy (t-butoxy)silane, triethoxy (n-hexyl)silane, triethoxy (n-octyl)silane, triethoxy (n-decyl)silane, triethoxy (n-dodeca)silane, triethoxy (n-tetradeca)silane, triethoxy (n-pentadeca)silane, triethoxy (n-hexadeca)silane, triethoxy (n-octadeca)silane, triethoxy cyclohexylsilane, triethoxyphenylsilane and triethoxy (3-glycidylpropyl)silane.

Specific examples of dialkoxysilanes include dimethoxysilanes such as dimethoxydimethylsilane, dimethoxydiethylsilane, dimethoxy methylphenyl silane, dimethoxy diphenylsilane and dimethoxy (bis-3-glycidylpropyl) silane, and diethoxysilanes such as diethoxydimethylsilane, diethoxydiethylsilane, diethoxy methylphenyl silane, diethoxydiphenylsilane and diethoxy (bis-3-glycidylpropyl) silane.

One alkoxysilane alone or a mixture of multiple kinds may be used.

A metal alkoxide may also be added to the alkoxysilane. Alkoxides of titanium, zirconium, hafnium, vanadium, niobium, tantalum, tungsten, aluminum, gallium, indium, and germanium may be used as the metal alkoxide. Examples of alkoxides include methoxides, ethoxides, n-propoxides, isopropoxides, n-butoxides, 2-butoxides and t-butoxides. The metal alkoxide may also have a ligand such as acetylacetone or an acetoacetic acid ester.

The polysiloxane or organosilicon polymer may be obtained by first converting the alkoxysilane raw material into a sol, and coating and then gelling it. Water or an acid or base may be added as a catalyst to promote sol formation. Heat may also be applied as necessary. An organic solvent may also be used to control the coating properties and reactivity.

Solvents capable of dissolving the aforementioned compounds may be used as the organic solvent, without any limitation, including alcohol solvents, ether solvents, Cellosolve solvents, ketone solvents, ester solvents and the like. Specific examples of alcohol solvents include methanol, ethanol, n-propanol, isopropanol, 1-butanol, 2-butanol, t-butanol, 1-pentanol and cyclohexanol.

A specific example of an ether solvents is dimethoxyethane. Specific examples of Cello solve solvents include methyl Cello solve and ethyl Cellosolve. Specific examples of ketone solvents include acetone, methyl ethyl ketone and methyl iso-butyl ketone. Specific examples of ester solvents include methyl acetate and ethyl acetate. One organic solvent or a mixture of two or more kinds may be used.

The method for forming the surface layer is not particularly limited, and a commonly used method may be selected. Specific examples include ring coating, dip coating, spray coating, and coating using a roll coater.

After the surface layer is formed, it may be heat treated to dry the solvent.

The surface properties such as dynamic friction and surface free energy can be adjusted by surface treating the surface layer. A specific method is exposure to active energy rays, and examples of active energy rays include ultraviolet rays, infrared rays, and electron beams.

The thickness of the surface layer is preferably 0.001 μm to 30 μm, or more preferably 0.005 μm to 5 μm.

An organic resin may also be used as an insulating material. Specific examples of the organic resin include vinyl resins, polyurethane resin, polyamide, urea resin, polyimide, melamine resin, fluorine resin, phenol resin, alkyd resin, silicone resin and polyester resin.

The developing apparatus is explained below with reference to the drawings. Unless otherwise specified, however, the dimensions, materials, shapes, and relative placements of the constituent members described below are not intended to limit the scope of the invention. Moreover, the materials, shapes and the like of members that have been explained once in the following explanations are the same in subsequent explanations unless otherwise specified.

Developing Apparatus

The following explanations reference FIG. 1, which shows one example of a cross-section of a process cartridge 10 with a built-in developing apparatus.

The developing apparatus 20 comprises a developer container 21 with an opening facing a photosensitive drum 11. The developer container 21 is provided with a developing roller (toner bearing member) 23, a scraping roller 24, a regulating blade (toner regulating member) 25, a toner holder 26, and a toner leak prevention sheet 27.

Figure 3:
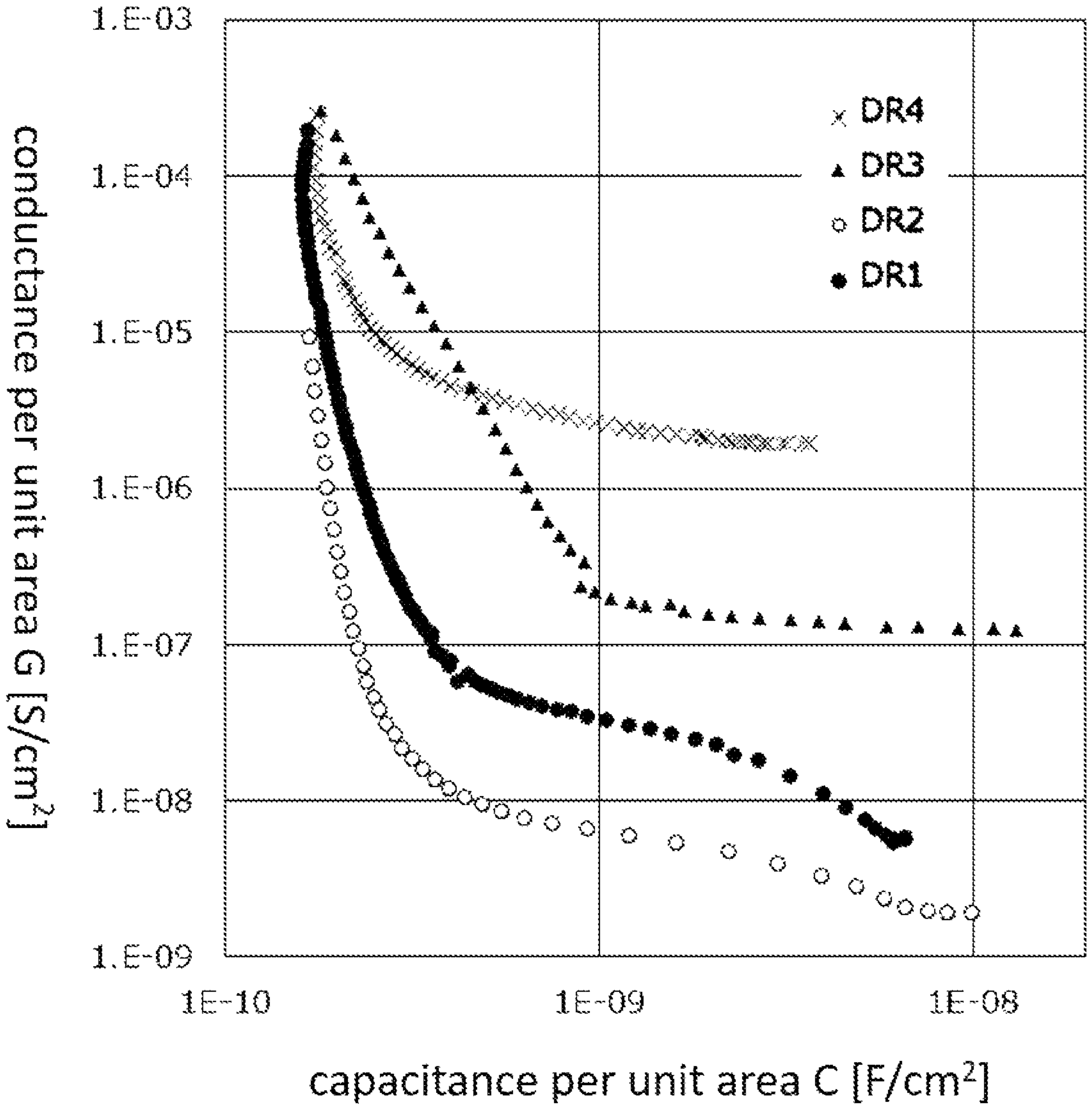
FIG. 3 is an example of the electrical characteristics of a developing roller.

The developing roller 23 contacts the photosensitive drum 11 and is driven rotationally in the direction of the arrow C in FIG. 3 with a predetermined peripheral speed ratio relative to the photosensitive drum 11. A predetermined bias is applied to the developing roller 23 from a developing bias source 23*c*, and an electrostatic latent image on the photosensitive drum 11 is developed and made visible with the toner.

The scraping roller 24 contacts the developing roller 23 and intrudes on the developing roller 23 by specific amount as it rotates in the same direction as the developing roller 23 (direction of arrow D in FIG. 3). Bias having the same potential as the bias applied to the developing roller 23 from the developing bias source 23*c* is also applied to the scraping roller 24.

The scraping roller 24 is comprised of a metal core 24*a* 5 mm in diameter as a conductive support and a surface layer 24*b* of urethane foam 3 mm in thickness. The foam cells of this urethane foam are connected so that the toner can enter and leave the urethane, and the roller as a whole including the urethane foam is 13 mm in diameter.

One end of the regulating blade 25 is fixed to the developer container 21, and the free end is disposed in contact with the developing roller 23 in the counter direction to the rotating direction of the developing roller 23 (direction of arrow C in FIG. 3).

The regulating blade 25 contributes charge to the toner, and also receives a predetermined bias from a blade bias source 25*c* and regulates the amount of toner on the developing roller 23 to form a toner layer of a uniform thickness.

The regulating blade 25 is composed of a supporting metal plate 25*a* made by bending a 1 mm-thick SUS plate into an L shape, and a blade 25*b* consisting of a 100 μm-thick SUS plate joined to the supporting metal plate by laser welding.

One end of the toner leak prevention sheet 27 is fixed to the developer container 21, and the free end is disposed in contact with the developing roller 23 in the with direction relative to the rotating direction of the developing roller 23 (direction of arrow C in FIG. 3).

A 50 μm-thick sheet of PET is used as the toner leak prevention sheet 27.

In the developing apparatus 20, the rotation of the scraping roller 24 transports the toner to the area of contact between the scraping roller 24 and the developing roller 23. The toner transported to the developing roller 23 is sent to the regulating blade 25 along with the rotation of the developing roller 23. The regulating blade 25 contributes charge to the toner while regulating the amount of toner on the surface of the developing roller 23 to form a toner layer of a uniform thickness.

−300 V of developing bias is applied to the developing roller 23 while −500 V of blade bias is applied to the regulating blade 25 during this process. Applying blade bias causes the regulating blade 25 to not only regulate the amount of toner to form a thin layer, but also to confer charge on the toner. After passing through the regulating blade 25, the toner is transported by the rotation of the developing roller 23 to the area of contact with the photosensitive drum 11 where it is used to develop the electrostatic latent image formed on the photosensitive drum 11.

Toner remaining on the surface of the developing roller 23 after development is transported to the area of contact with the scraping roller 24, where it is removed (scraped) from the surface of the developing roller 23 by the scraping roller 24. The removed toner is sent to a toner holder (not shown), and then transported again to the scraping roller 24.

The various analysis methods are next explained in detail below.

Relative Permittivity and Volume Resistivity of Toner

The capacitance and conductivity of the air and the toner are measured by impedance measurement using a parallel plate capacitor.

For the measurement apparatus, a toner measurement jig composed of an SH2-Z 4-terminal sample holder (Toyo Corp.) and an optional SH-TRQ-AD torque wrench adapter is used with a ModuLab XM MTS materials testing system (Solartron).

An NCT-I3 1.4 kVA noise cut transformer (Denkenseiki) is used to suppress commercial power source noise, and a sealed box is used to suppress magnetic wave noise.

Using the 4-terminal sample holder with the optional SH-TRQ-AD torque wrench adapter as the toner measurement jig, and using an SH-H25 AU upper electrode (ø25 mm solid electrode) and an SH-2610 AU lower electrode for liquid/powder measurement (central electrode ø10 mm; guard electrode ø26 mm) as the parallel plate electrodes, the system is configured so that resistance of 0.1Ω to 1T Ω can be measured with respect to an electrical signal of maximum 500 V p-p, DC to 1 MHz.

The 4-terminal sample holder is provided with a micrometer for measuring the film thickness between the upper and lower electrodes, and the SH-TRQ-AD torque wrench adapter (Toyo Corp.) is attached to this micrometer to adjust the pressurization of the toner sample.

An RTD15CN torque driver (Tohnichi Mfg.) with a 6.35 mm square bit is provided as a torque driver for pressurization control, and configured so that the tightening torque can be controlled at 6.5 cN·m.

Impedance measurement is performed using a ModuLab XM MTS materials testing system (Solartron) to measure the electrical AC characteristics.

The ModuLab XM MTS is composed of an XM MAT 1 MHz control module, an XM MHV100 high-voltage module, an XM MFA femto current module and an XM MRA 1 MHz frequency response analysis module, and the same company's XM-studio MTS Ver. 3.4 is used as the control software.

The toner measurement conditions are Normal Mode (measurement only), AC level 7 V rms, DC bias 0 V, sweep frequency 1 MHz to 0.01 Hz (12 points/decade or 6 points/decade).

The following settings are also added at each sweep frequency considering noise suppression and shortening of the measurement time.

Sweep frequency 1 MHz to 10 Hz Measurement integration time 64 cycles

Sweep frequency 10 Hz to 1 Hz Measurement integration time 24 cycles

Sweep frequency 1 Hz to 0.01 Hz Measurement integration time 1 cycle

The impedance characteristics (electrical AC characteristics) are measured under these measurement conditions.

Using a toner measurement jig based on a parallel plate capacitor, the impedance characteristics of the air and the sample at a ø10 mm measurement electrode size S and a film thickness d determined by the pressurization torque are measured under the above conditions.

Data correction processing of the measurement system is performed from the resulting air and sample impedance characteristics, to obtain a highly reliable capacitance C and conductance (conductivity) G. The electrical properties of relative permittivity and conductivity are determined from the resulting capacitance C and conductance (conductivity) G and the geometric shape of the toner measurement jig (parallel plate electrode size S and sample film thickness).

Due to individual differences in SH2-Z 4-terminal sample holders used in powder measurement jigs, two verifications have to be performed in advance to discover the optimal measurement conditions when the SH2-Z 4-terminal sample holder is used for the first time.

The first verification concerns the film thickness dependency of the 4-terminal sample holder. The dependency on the air thickness (distance between upper and lower electrodes) is measured, and the error between the theoretical capacitance value and the measured capacitance value is confirmed to discover the optimal range or optimal value of the film thickness at which the measurement error is minimized.

The second verification is a measurement of mechanical error. Toner sample measurements apply a torque-controlled load to keep the volume density constant. By contrast, the air is measured without load. Film thickness errors occur during this process due to dimensional effects such as mechanical processing accuracy. Consequently, the offset value of the tightening torque control value (6.5 cN·m with this jig) with and without load is confirmed and given as the offset correction value.

The specific sample preparation and measurement procedures are as follows.

(1) The central electrode part of the lower electrode is filled with toner, which is then molded into a trapezoidal shape 5 mm high.

(2) The lower electrode with the toner is attached to the SH2-Z 4-terminal sample holder, and the upper electrode is lowered.

(3) With the lower electrode fixed so that it does not inadvertently rotate, the upper electrode is lowered to the upper edge of the toner.

(4) Smoothing is performed by rotating the upper electrode to the left and right as the toner is made smooth.

(5) The direction of rotation of the upper electrode is kept constant in one direction as the thickness is adjusted to the predetermined thickness with a micrometer.

(6) Pressure is applied with a torque driver with the tightening torque controlled at 6.5 cN·m.

(7) The sample thickness is measured with a micrometer.

(8) Impedance measurement is performed under these conditions.

(9) After completion of measurement, the upper electrode is lifted, and the lower electrode is removed. Care is taken so that toner does not enter the lower electrode contact terminal of the 4-terminal sample holder as the lower electrode is removed and protected with masking tape.

(10) The upper and lower electrodes are washed.

(11) The masking tape is removed, and the lower electrode is reattached.

(12) The sample thickness d determined in step (7) is adjusted so that the air thickness t includes the offset correction in a no-load state, and the direction of rotation of the upper electrode is kept constant in one direction.

(13) Air impedance measurement is performed.

(14) When the air measurement data (dissipation factor: tanδ) obtained in step (13) is 0.002 or more within the frequency range of 100 Hz to 0.01 Hz, this means that washing is insufficient, and the operations are repeated beginning with the washing step of step (10).

Measurement is performed at 25° C.

The specific data processing procedures are as follows.

(15) The phase characteristics error relative to the theoretical value is calculated from the measured air impedance characteristics, and the phase correction data of the ModuLab XM MTS materials testing system (Solartron) are obtained.

(16) The phase correction data calculated in step (15) are applied to the air impedance characteristics measured in step (13) to obtain phase-corrected air impedance characteristics.

(17) The capacitance Ca is calculated from the admittance (Ya=Ga+jωCa) of the phase-corrected air impedance characteristics, the error from the theoretical value is calculated, and correction data a for film thickness error are obtained.

(18) The phase correction data obtained in step (15) are applied to the toner sample impedance characteristics measured in step (8).

(19) The air capacitance Ca and correction data a obtained in step (17) are applied to the complex admittance (Ym=Gm+jωCm) of the phase-corrected characteristics of step (18) to calculate highly reliable relative permittivity and conductivity values for the toner sample.

The specific procedures for identifying the electrical properties are as follows.

The following steps are applied to the relative permittivity and conductivity values obtained for the toner sample in step (19) to identify the electrical property parameters of relative permittivity and volume resistivity.

(20) The relative permittivity at the frequency at which the dissipation factor tanδ is the smallest in the frequency range of 1 kHz to 400 kHz is identified.

(21) The conductivity at a frequency of 0.01 Hz is determined, and the reciprocal of this conductivity is identified as the volume resistivity. When ohmic characteristics appear, the reciprocal of the conductivity at any low frequency may be identified as the volume resistivity.

The capacitance Ctn ($pF/cm^2$) per unit area and the volume resistance value Rtn ($\Omega/cm^2$) per unit area of the toner based on a parallel plate capacitor model using a thickness of 1.5 the toner particle diameter (weight-average particle diameter D4) are calculated from the above measurement results by the following formulae.

$$Ctn=(\text{permittivity of vacuum})\times(\text{measured relative permittivity})\times(\text{unit area})/(\text{thickness})$$

$$Rtn=(\text{thickness})/(\text{unit area})/(\text{measured conductivity})$$

Measuring Capacitance and Volume Resistance of Toner Carrying Member

The capacitance Cdr and volume resistance Rdr of the toner bearing member are measured as electrical AC characteristics by impedance measurement.

Electrical characteristics evaluation of the toner bearing member is normally performed using a ModuLab XM MTS (Solartron) materials testing system, in combination with a high-voltage impedance measurement system (Toyo Corp.) in the case of a high-resistance body exhibiting insulating properties. A measurement jig using cylindrical microelectrodes was invented and used to perform the electrical characteristics evaluation of the toner bearing member due to concerns about edge capacitor (stray capacitance) effects occurring at the end where the measurement electrodes contact the surface of the toner bearing member.

Specifically, a ø0.65 mm cylindrical check terminal CH2-3 (Mac-Eight Co., Ltd.) was soldered to an SHV connector 317.580.000 (Radiall) having an insulating resistance of 1 TΩ to prepare a contact electrode jig that energizes the toner bearing member.

A probe used in manual probers and the like is used as a contact jig in contact with the metal core of the toner bearing member. This probe is composed of an HP80/R-M-GB model positioner for position control, an HCP40-HV 1.5K high-voltage probe, and a PT250-25 needle probe with a tip radius of 25 μm (HiSOL Inc.). A stray capacitance of not more than 0.1 pF was achieved with a measurement jig using this probe.

To measure the electrical AC characteristics, impedance measurement is performed with a ModuLab XM MTS materials measurement system (Solartron).

The ModuLab XM MTS is composed of an XM MAT 1 MHz control module, an XM MHV100 high-voltage module, an XM MFA femto current module and an XM MRA 1 MHz frequency response analysis module, and the same company's XM-studio MTS Ver. 3.4 is used as the control software.

The toner measurement conditions are Normal Mode (measurement only), AC level 7 V rms, DC bias 0 V, sweep frequency 1 MHz to 0.01 Hz (12 points/decade or 6 points/decade).

The following additional settings are added at each sweep frequency considering noise suppression and shortening of the measurement time.

Sweep frequency 1 MHz to 10 Hz Measurement integration time 128 cycles

Sweep frequency 10 Hz to 1 Hz Measurement integration time 64 cycles

Sweep frequency 1 Hz to 0.1 Hz Measurement integration time 24 cycle

Sweep frequency 0.1 Hz to 0.01 Hz Measurement integration time 1 cycle

The impedance characteristics (electrical AC characteristics) are measured under these measurement conditions.

The system was used in combination with a high-voltage impedance measurement system (Toyo Corp.) when measuring the impedance of the toner bearing member, which is a high-resistance body exhibiting insulating properties.

The high-voltage impedance measurement system comprises a 126096W dielectric impedance measurement system consisting of a 1260 impedance analyzer and a 1296 dielectric interface, together with a 2220 high-voltage amp as a DC amp (Trek Co.), an HVA800 high-speed amp as an AC amp (Toyo Corp.), a 6792 high-voltage AC/DC impedance for high-voltage control of the AC/DC signal (Toyo Corp.), and a 6796 reference box for monitoring and capacitance correction of the high-voltage signal (Toyo Corp.), and SMaRT Ver. 3.31 is used as the control software.

The measurement conditions for the toner bearing member are External Mode for correction using external capacity, AC level 7 V rms, DC bias 0 V, sweep frequency 100 kHz to 0.0215 Hz (12 points/decade or 6 points/decade).

The following additional settings are also performed at each sweep frequency considering the measurement time and the reproducibility and accuracy of the measurement data.

Sweep frequency 100 kHz to 10 kHz Measurement delay cycle 1000

Measurement integration time 768 cycles

Sweep frequency 10 kHz to 1 kHz Measurement delay cycle 500

Measurement integration time 512 cycles

Sweep frequency 1 kHz to 100 Hz Measurement delay cycle 20

Measurement integration time 384 cycles

Sweep frequency 100 Hz to 10 Hz Measurement delay cycle 10

Measurement integration time 64 cycles

Sweep frequency 10 Hz to 1 Hz Measurement delay cycle 1

Measurement integration time 16 cycles

Sweep frequency 1 Hz to 0.1 Hz Measurement delay cycle 1

Measurement integration time 8 cycles

Sweep frequency 0.1 Hz to 0.0215 Hz Measurement delay cycle 1

Measurement integration time 4 cycles

The impedance characteristics (electrical AC characteristics) are measured under these measurement conditions.

An NCT-I3 1.4 kVA noise cut transformer (Denkenseiki) is used to suppress commercial power source noise, and a sealed box is used to suppress magnetic wave noise during impedance measurement.

The specific measurement procedures are as follows.

(1) Only the toner bearing member is set in a Teflon V-shaped groove.

(2) Communication with the metal core of the toner bearing member is established through the needle probe, which is a contact jig.

(3) The cylindrical electrodes for measurement are fixed at a position where they are not affected by stray capacitance, and data are measured in an OPEN state. If the capacitance is 0.1 pF or more, accurate measurement has not been performed. Improvement is also necessary because there has been some problem with the measurement jig or measurement apparatus.

(4) The ø0.65 mm cylindrical electrode is brought into contact with the toner bearing member, and measurement is performed.

(5) When ohmic characteristics appear during measurement, it may not be necessary to measure down to the lowest frequency (0.01 Hz).

The specific data processing procedures are as follows.

Phase correction is performed only on the measurement results from the ModuLab materials testing system. The error from the theoretical value is calculated as correction data from the measurement data (phase characteristics) in an OPEN state from step (3).

The measurement data from step (4) are phase corrected using the above phase correction data.

(6) The complex admittance ($Ym=Gm+j\omega Cm$) of the measured or phase-corrected characteristics is subjected to area conversion from the ø0.65 mm measurement electrode area to the characteristics per unit area of 1 square centimeter.

The specific identification procedures are as follows.

Method for Identifying Number of Elementary Processes

The presence or absence of a maximum value is identified by the zero-crossing method, with the frequency dependency of the dissipation factor tanδ first-order differentiated. When no maximum value is found, the number of elementary processes is judged to be 1 because no interface has formed with different dielectric relaxations. When one maximum value is found, the number of elementary processes is judged to be 2 because an interface has formed with different dielectric relaxations.

Method for Identifying Resistance Value

Different identification procedures are performed depending on whether or not the dissipation factor tanδ is at least 10 at high frequencies of 0.1 Hz and above.

Cases in which the dissipation factor tanδ is at least 10 are discussed below.

A log-log graph is prepared with the conductance Gm on the vertical axis and the capacitance Cm on the horizontal axis. The measurement frequency range at which the first derivative of this Gm-Cm characteristic is not more than −0.5 is determined, and the median value of the conductance Gm at this frequency range is calculated. The reciprocal of the calculated median is identified as the resistance value.

Cases in which the dissipation factor tanδ is not 10 or more are discussed next.

The frequency that yields the maximum value is determined by the zero-crossing method, with the frequency dependency of the dissipation factor tanδ first-order differentiated. The reciprocal of the conductance Gm at the determined frequency is identified as the resistance value. When a maximum value cannot be detected for the dissipation factor tanδ, the reciprocal of the conductance Gm at 0.01 Hz is identified as the resistance value.

The volume resistance value Rdr per unit area of the toner bearing member is calculated by area conversion from the resulting resistance value.

Method for Identifying Capacitance

A complex response function called a modulus is used to identify the capacitance. The modulus is defined as $M=j\omega Z$ and can be determined from the impedance characteristic Z (reciprocal of admittance Y).

The frequency dependency of the imaginary term of the modulus M is calculated to determine the frequency exhibiting the maximum value. The frequency exhibiting the maximum value can be identified by the zero-crossing detection method using a first derivative operation, and the capacitance Cm at this frequency is identified as a parameter.

Cases in which there are multiple maximum values are discussed below.

A log-log graph is prepared with the conductance Gm on the vertical axis and the capacitance Cm on the horizontal axis, and a first derivative operation is performed on the Gm-Cm characteristics to determine the range of measurement frequencies at which the first derivative is −1. For frequencies exhibiting the multiple maximum values, a maximum value close to the measurement frequency at which the first derivative is −1 is selected.

When the frequencies exhibiting the multiple maximum values differ by the same amount from the measurement frequency at which the first derivative operation is −1, the frequency on the high frequency end is selected. The capacitance Cm at the resulting frequency exhibiting the maximum value is thus identified.

The capacitance Ctn per unit area of the toner bearing member is calculated by area conversion from the resulting capacitance Cm.

Method for Measuring Weight-Average Particle Diameter (D4) and Number-Average Particle Diameter (D1)

Regarding the toner, the toner particle, and the toner base particle (hereunder called the toner, etc.), the weight-average particle diameters (D4) and number-average particle diameters (D1) thereof are calculated as follows.

A Multisizer 3 Coulter Counter™ (Beckman Coulter) precision particle size distribution analyzer based on the pore electrical resistance method and equipped with a 100-μm aperture tube is used as the measurement apparatus. The dedicated software (Multisizer 3 Version 3.51, Beckman Coulter) included with the apparatus is used for setting the measurement conditions and analyzing the measurement data. Measurement is performed with 25,000 effective measurement channels.

The aqueous electrolytic solution used for measurement is a solution of special grade sodium chloride dissolved in deionized water to a concentration of about 1.0%, such as Isoton II™ (Beckman Coulter).

The following settings are performed on the dedicated software prior to measurement and analysis.

On the "Change Standard Operating Method (SOMME)" screen of the dedicated software, the total count number in control mode is set to 50,000 particles, the number of measurements to 1, and the Kd value to a value obtained using "Standard particles 10.0 μm" (Beckman Coulter). The threshold value and noise level are set automatically by pressing the "Threshold/Noise level measurement" button. The current is set to 1,600 μA, the gain to 2, and the electrolytic solution to Isoton II, and a check is entered for "Aperture flush after measurement".

On the "Conversion setting from pulse to particle diameter" screen of the dedicated software, the bin interval is set to the logarithmic particle diameter and the particle diameter bins to 256 particle diameter bins, with a particle size range of 2 μm to 60 μm.

The specific measurement methods are as follows.

(1) 200.0 ml of the aqueous electrolytic solution is placed in a 250 ml glass round-bottomed beaker dedicated to the Multisizer 3, and this is set in the sample stand, and stirred counter-clockwise with the stirrer rod at a rate of 24 rotations per second. Contamination and air bubbles in the aperture tube are then removed by the "Aperture flush" function of the dedicated software.

(2) 30.0 ml of the aqueous electrolytic solution is placed in a 100 ml glass flat-bottomed beaker, and about 0.3 ml of a diluted solution of "Contaminon N" (a 10% aqueous solution of a pH 7 neutral detergent for cleaning precision measurement instruments, comprising a non-ionic surfactant, an anionic surfactant, and an organic builder, manufactured by Wako Pure Chemical Industries) diluted 3 times by mass with deionized water is added thereto as a dispersant.

(3) An ultrasound disperser with an electrical output of 120 W equipped with two oscillators with an oscillation frequency of 50 kHz built in with their phases shifted by 180 degrees (Ultrasonic Dispersion System Tetra 150, Nikkaki Bios) is prepared. About 3.3 L of deionized water is placed in the water tank of the ultrasound disperser, and about 2.0 ml of Contaminon N is then added to the water tank.

(4) The beaker of (2) above is set in the beaker fixing hole of the ultrasound disperser, and the ultrasound disperser is operated. The vertical position of the beaker is adjusted so as to maximize the resonance state of the surface of the electrolytic solution in the beaker.

(5) About 10 mg of the toner, etc. is added bit by bit and dispersed in the aqueous electrolytic solution in the beaker of (4) above as the aqueous electrolytic solution is exposed to ultrasound. Ultrasound dispersion is then continued for another 60 seconds. The water temperature of the water tank is adjusted appropriately so as to be from 10° C. to 40° C. during ultrasound dispersion.

(6) The aqueous electrolytic solution of (5) above containing the dispersed toner, etc. is dripped with a pipette into the round-bottomed beaker of (1) above set in the sample stand to adjust the measurement concentration to 5%. Measurement is then performed until the number of measured particles reaches 50,000.

(7) The measurement data are analyzed with the above dedicated software included with the apparatus to calculate the weight-average particle diameter (D4) and number-average particle diameter (D1). The weight-average particle diameter (D4) is the "average diameter" on the "Analysis/volume statistics (arithmetic mean)" screen when graph/vol % is set on the dedicated software. The number-average particle diameter (D1) is the "average diameter" on the "Analysis/volume statistics (arithmetic mean)" screen when "graph/number %" is set on the dedicated software.

Observing Toner Surface by STEM-EDS

A section containing the outermost surface of the toner is observed by the following methods using a scanning transmission electron microscope (STEM).

The toner is first thoroughly dispersed in a room temperature curable epoxy resin and cured for 2 days in a 40° C. atmosphere. A 50 nm-thick flake-shaped sample containing the outermost surface of the toner is cut from the cured product with an ultramicrotome (EM UC7: Leica) equipped with a diamond blade.

This sample is magnified 100,000 times using a STEM (JEM2800, JEOL) at an acceleration voltage of 200 V and an electron beam probe size of 1 mm, and the outermost surface of the toner is observed.

The constituent elements of the observed outermost surface of the toner are then analyzed by energy dispersive X-ray analysis (EDS), and an EDS mapping image (256×256 pixels, 2.2 nm/pixel, cumulative number 200) is prepared.

If a signal derived from a metal element is observed on the toner surface in the prepared EDS mapping image and a particle is observed at the same location in the STEM image, the particle is called a metal compound fine particle A.

Method for Confirming Shell Containing Organosilicon Polymer by STEM-EDS

The toner is observed in cross-section by the following methods using a scanning transmission electron microscope (STEM).

The toner is first thoroughly dispersed in a room temperature curable epoxy resin and cured for 2 days in a 40° C. atmosphere.

A 50 nm-thick flake-shaped sample is then cut from the cured product with an ultramicrotome (EM UC7: Leica) equipped with a diamond blade.

This sample is magnified 100,000 times using a STEM (JEM2800, JEOL) at an acceleration voltage of 200 V and an electron beam probe size of 1 mm, and the toner is observed in cross-section. At this stage, a toner cross-section having a maximum diameter of 0.9 to 1.1 times the number-average particle diameter (D1) of the same toner as measured by the methods described above for measuring the number-average particle diameter (D1) is selected.

The constituent elements in the resulting toner cross-section are then analyzed by energy dispersive X-ray analysis (EDS), and an EDS mapping image (256×256 pixels, 2.2 nm/pixel, cumulative number 200) is prepared.

In the prepared EDS mapping image, a signal derived from constituent elements of the organosilicon polymer is confirmed in the contour of the toner particle cross-section. When this signal is observed in at least 80% of the length of the contour of the toner particle cross-section, and the signal is confirmed by the "Method for Confirming Organosilicon Polymer" below to derive from the organosilicon polymer, the signal is considered an image of a shell containing the organosilicon polymer.

Method for Confirming Organosilicon Polymer

The organosilicon polymer on the toner particle surface is confirmed by comparing the ratio of the atomic contents (atomic %) of Si and O (Si/O ratio) with standard samples.

Standard samples of the organosilicon polymer and the silica fine particle are subjected to EDS analysis under the conditions described under "Method for Confirming Shell Containing Organosilicon Polymer by STEM-EDS" to obtain atomic contents (atomic %) for Si and O.

A is given as the Si/O ratio of the organosilicon polymer and B as the Si/O ratio of the silica fine particle. Measurement conditions under which A is significantly greater than B are selected.

Specifically, the standard samples are measured 10 times under the same conditions, and arithmetic mean values are obtained for A and B. Measurement conditions under which the resulting mean values fulfill A/B>1.1 are selected.

If a part where silicon is detected in the EDS image has an Si/O ratio skewed towards A from [(A+B)/2], this part is judged to be the organosilicon polymer. Conversely, if the Si/O ratio is skewed towards B from [(A+B)/2], it is judged to be the silica.

Tospearl 120A (Momentive Performance Materials Japan) is used for the standard sample of the organosilicon polymer, and HDK V15 (Asahi Chemical) as the standard sample of the silica fine particle.

Method for Detecting Polyvalent Acid Metal Salt

The polyvalent acid metal salt on the toner particle surface is detected by the following method using time-of-flight second ion mass spectrometry (TOF-SIMS).

The toner sample is analyzed under the following conditions using a TOF-SIMS unit (TRIFTIV: Ulvac-Phi).

Primary ion species: Gold ion ($Au^+$)
Primary ion current value: 2 pA
Analysis area: 300×300 $\mu m^2$
Pixels: 256×256 pixels
Analysis time: 3 minutes
Repeating frequency: 8.2 kHz
Charge neutralization: ON
Secondary ion polarity: Positive
Secondary ion mass range: m/z 0.5 to 1,850
Sample substrate: Indium Analysis is performed under these conditions, and the polyvalent acid metal salt is present on the toner particle surface when peaks are detected deriving from secondary ions including gold ions and polyvalent acid ions (for example, $TiPO_3$ (m/z 127), $TiP_2O_5$ (m/z 207) or the like in the case of titanium phosphate).

EXAMPLES

The present invention is explained in detail below using the following manufacturing examples and examples. However, these examples do not limit the present invention. Parts and percentages in the manufacturing examples and examples are based on mass unless otherwise specified.

Toner Manufacturing Examples

Organosilicon Compound Manufacturing Example

| | |
|---|---|
| Deionized water | 70.0 parts |
| Methyl triethoxysilane | 30.0 parts |

These materials were weighed into a 200 ml beaker, and the pH was adjusted to 3.5 with 10% hydrochloric acid. This was then heated to 60° C. in a water bath while being stirred for 1.0 hours to obtain an organosilicon compound solution.

Aqueous Medium Manufacturing Example

Aqueous Medium 1

11.2 parts of sodium phosphate (12-hydrate) were added to a reactor containing 390.0 parts of deionized water and kept warm at 65° C. for 1.0 hour under nitrogen purging. This was stirred at 12,000 rpm with a T.K. Homomixer (Tokushu Kika). Stirring was maintained as a calcium chloride solution of 7.4 parts of calcium chloride (dihydrate) dissolved in 10.0 parts of deionized water was added all at once to the reactor to prepare an aqueous medium containing a dispersion stabilizer. 1.0 mol/L hydrochloric acid was further added to the aqueous medium in the reactor to adjust the pH to 6.0 and obtain an aqueous medium 1.

Aqueous Media 2 to 6

Aqueous media 2 to 6 were obtained as in the manufacturing example of the aqueous medium 1 except that the added amounts of the materials were changed as shown in Table 1 below.

TABLE 1

| | Deionized water (parts) | Sodium phosphate (12-hydrate) (parts) | Deionized water (parts) | Calcium chloride dihydrate (2-hydrate) (parts) |
|---|---|---|---|---|
| Aqueous medium 1 | 390.0 | 11.2 | 10.0 | 7.4 |
| Aqueous medium 2 | 387.5 | 14.0 | 12.5 | 9.3 |
| Aqueous medium 3 | 392.0 | 9.0 | 8.0 | 5.9 |
| Aqueous medium 4 | 386.0 | 15.7 | 14.0 | 10.4 |
| Aqueous medium 5 | 389.0 | 12.3 | 11.0 | 8.1 |
| Aqueous medium 6 | 385.0 | 16.8 | 15.0 | 11.1 |

Manufacturing Untreated Magnetic Material

A caustic soda solution in the amount of 1.0 equivalents of the iron element and soda silicate in the amount of 1.5 mass % as silicon element relative to the iron element were mixed with a ferrous sulfate aqueous solution to prepare an aqueous solution containing ferrous hydroxide. The aqueous solution was maintained at pH 9.0 as air was blown in and an oxidation reaction was performed at 80° C. to 90° C. to prepare a slurry solution for producing seed crystals.

A ferrous sulfate aqueous solution was then added to this slurry solution in the amount of 1.0 equivalents of the amount of alkali (sodium component of caustic soda). The slurry was then maintained at pH 8.0, and air was blown in as an oxidation reaction was performed to obtain a slurry solution containing a magnetic iron oxide. This slurry was filtered and washed, and then filtered again. This was then crushed and dried to obtain an untreated magnetic material.

Preparing Silane Compound 20 parts of isobutyl trimethoxysilane were dripped into 80 parts of deionized water under stirring. This aqueous solution was maintained at pH 5.5, 40° C. and dispersed and hydrolyzed for 2 hours with a Disper blade at 0.46 m/s to obtain a silane compound in the form of an aqueous solution containing a hydrolysate.

Manufacturing Treated Magnetic Material

The untreated magnetic material was placed in a Henschel mixer (Nippon Coke & Engineering) and dispersed at 34.5 m/s as the silane compound was added by spraying. This was dispersed as is for 10 minutes, after which the magnetic material with the silane compound adsorbed thereon was removed and left standing for 2 hours at 160° C. to dry the treated magnetic material and promote a condensation reaction of the silane compound. This was then passed through a 100 μm mesh to obtain a treated magnetic material.

Preparing Polymerizable Monomer Composition

Polymerizable Monomer Composition 1

| | |
|---|---|
| Styrene | 60.0 parts |
| C.I. Pigment Red 122 | 8.0 parts |

These materials were added to an attritor (Nippon Coke & Engineering) and dispersed for 5.0 hours at 220 rpm with zirconia particles 1.7 mm in diameter, after which the zirconia particles were removed to prepare a colorant dispersion of a dispersed pigment.

The following materials were then added to the colorant dispersion.

| | |
|---|---|
| Styrene | 15.0 parts |
| N-butyl acrylate | 25.0 parts |
| Hexanediol diacrylate | 0.5 parts |
| Polyester resin | 5.0 parts |

(polycondensate of terephthalic acid and bisphenol A propylene oxide 2-mol adduct, weight-average molecular weight Mw 10,000, acid value 8.2 mg KOH/g)

Release agent (hydrocarbon wax, melting point 79° C.) 9.0 parts

These materials were kept warm at 65° C. and uniformly dissolved and dispersed at 500 rpm with a T.K. Homomixer to prepare a polymerizable monomer composition 1.

Polymerizable Monomer Composition 2

| | |
|---|---|
| Styrene | 75.0 parts |
| N-butyl acrylate | 25.0 parts |
| Hexanediol diacrylate | 0.5 parts |
| Treated magnetic material | 90.0 parts |
| Polyester resin | 5.0 parts |

(polycondensate of terephthalic acid and bisphenol A propylene oxide 2-mol adduct, weight-average molecular weight Mw 10,000, acid value 8.2 mg KOH/g)

Release agent (hydrocarbon wax, melting point 79° C.) 15.0 parts

These materials were kept warm at 65° C. and uniformly dissolved and dispersed at 500 rpm with a T.K. Homomixer to prepare a polymerizable monomer composition 2.

Toner Base Particle Dispersion Manufacturing Examples

Toner Base Particle Dispersion 1

Granulation Step

The temperature of the aqueous medium 1 was maintained at 70° C. and the rotation of the stirring apparatus at 12,500 rpm as the polymerizable monomer composition 1 was added to the aqueous medium 1, and 8.0 parts of the polymerization initiator t-butyl peroxypivalate were added. This was granulated for 10 minutes as is in the stirring apparatus with the rotation maintained at 12,500 rpm.

Polymerization Step

The high-speed stirring apparatus was replaced with a stirrer having a propeller blade, the temperature was maintained at 70° C. under stirring at 200 rpm and polymerization was performed for 5.0 hours, after which the temperature was raised to 85° C. and the mixture was heated for 2.0 hours to perform a polymerization reaction. The temperature was then further raised to 98° C. and the mixture was heated for 3.0 hours to remove residual monomers.

This was then cooled to 55° C. and maintained at 55° C. for 5.0 hours under continued stirring. The temperature was then lowered to 25° C. Deionized water was added to adjust the toner base particle concentration in the dispersion to 30.0% and obtain a toner base particle dispersion 1 of a dispersed toner base particle 1. The weight-average particle diameter (D4) of the toner base particle 1 was 6.7 μm.

Toner Base Particle Dispersions 2 to 7

Toner base particle dispersions 2 to 7 were obtained as in the manufacturing example of the toner base particle dispersion 1 except that the combination of the aqueous medium and polymerizable monomer composition was changed as shown in Table 2. The weight-average particle diameters (D4) of the resulting toner base particles are shown in Table 2.

TABLE 2

| | Aqueous medium | Polymerizable monomer composition | D4 (μm) |
|---|---|---|---|
| Toner base particle dispersion 1 | 1 | 1 | 6.7 |
| Toner base particle dispersion 2 | 2 | 1 | 5.4 |
| Toner base particle dispersion 3 | 3 | 1 | 8.4 |
| Toner base particle dispersion 4 | 4 | 1 | 4.8 |
| Toner base particle dispersion 5 | 1 | 2 | 6.7 |
| Toner base particle dispersion 6 | 5 | 1 | 6.1 |
| Toner base particle dispersion 7 | 6 | 1 | 4.3 |

Toner Particle Manufacturing Examples

Toner Particle 1

1 mol/L hydrochloric acid was added to the toner base particle dispersion 1 to adjust the pH to 1.5, and this was stirred for 1.0 hour and then washed with deionized water, filtered, and dried to obtain a toner particle 1.

The toner particle 1 had a weight-average particle diameter (D4) of 6.7

Toner Particles 2 to 7

Toner particles 2 to 7 were obtained as in the manufacturing example of the toner particle 1 except that the toner base particle dispersion was replaced with those shown in Table 3. The weight-average particle diameters (D4) of the resulting toner particles are shown in Table 3.

TABLE 3

| | Toner base particle dispersion | D4 (μm) |
|---|---|---|
| Toner particle 1 | 1 | 6.7 |
| Toner particle 2 | 2 | 5.4 |
| Toner particle 3 | 3 | 8.4 |
| Toner particle 4 | 4 | 4.8 |

TABLE 3-continued

| | Toner base particle dispersion | D4 (μm) |
|---|---|---|
| Toner particle 5 | 5 | 6.7 |
| Toner particle 6 | 6 | 6.1 |
| Toner particle I | 7 | 4.3 |

Toner Particle 1A

Organosilicon Polymer Forming Step

The following samples were measured into a reactor and mixed with a propeller blade.

| | |
|---|---|
| Toner base particle dispersion 1 | 500.0 parts |
| Organosilicon compound solution | 40.0 parts |

The pH of the resulting mixture was then adjusted to 9.5 with a 1 mol/L NaOH aqueous solution, and the temperature of the mixture was adjusted to 50° C., after which this was maintained for 1.0 hour while being mixed with a propeller mixing blade.

Polyvalent Acid Metal Salt Attachment Step

| | |
|---|---|
| Titanium lactate 44% aqueous solution (TC-310: Matsumoto Fine Chemical) | 3.2 parts (equivalent to 1.4 parts of titanium lactate) |
| Organosilicon compound solution | 10.0 parts |

The above samples were measured and mixed in a reactor, after which the pH of the resulting mixture was adjusted to 9.5 with a 1 mol/L NaOH aqueous solution, and this was maintained for 4.0 hours. The temperature was lowered to 25° C., the pH was adjusted to 1.5 with 1 mol/L hydrochloric acid, and the mixture was stirred for 1.0 hours and then washed with deionized water and filtered to obtain a toner particle 1A.

Toner Particles 2A, 3A, 1B

Toner particles 2A, 3A and 1B were obtained as in the manufacturing example of the toner particle 1A except that the amounts of the toner base particle dispersion, organosilicon compound solution and titanium lactate 44% aqueous solution were changed as shown in Table 4.

TABLE 4

| | Toner base particle dispersion | Organosilicon compound solution | Titanium lactate 44% aqueous solution |
|---|---|---|---|
| Toner particle 1A | 1 | 40.0 parts | 3.2 parts |
| Toner particle 2A | 2 | 49.6 parts | 4.0 parts |
| Toner particle 3A | 3 | 31.9 parts | 2.6 parts |
| Toner particle 1B | 1 | 30.0 parts | 3.2 parts |

Toner Manufacturing Example

Toner 1

The toner particle 1A was used as the toner 1.

When a cross-section of the toner 1 was observed by STEM-EDS, polyvalent acid metal salt fine particles and a shell containing the organosilicon compound were observed on the toner particle surface. Ions deriving from a titanium phosphate compound were also detected in analysis of the toner 1 by time-of-flight secondary ion mass spectrometry (TOF-SIMS).

The titanium phosphate compound is a reaction product of titanium lactate with phosphate ions derived from sodium phosphate or calcium phosphate in the toner base particle dispersion 1.

The toner 1 had a volume resistivity of $2.9\times10^{13}$ (Ω·cm), a relative permittivity of 1.9 and a weight-average particle diameter (D4) of 6.7 μm.

The physical property values for the toner 1 are shown in Table 6.

Toners 4, 6 and 13

The toner particle 2A was used as the toner 4, the toner particle 3A as the toner 6 and the toner particle 1B as the toner 13. The physical property values for the toners 4, 6 and 13 are shown in Table 6.

Toner 2

| | |
|---|---|
| Toner particle 1 | 100.0 parts |
| Silica fine particle 1 | 2.0 parts |

These materials were placed in a Supermixer Piccolo SMP-2 (Kawata), and mixed for 5 minutes at 3,000 rpm with 45° C. warm water supplied to the jacket to warm the inside of the tank to 45° C.

| | |
|---|---|
| Silica fine particle 2 | 2.0 parts |
| Titanium oxide fine particle 1 | 6.0 parts |

The above materials were then added to the Supermixer Piccolo SMP-2 (Kawata), and mixed for 10 minutes at 3,000 rpm with 20° C. cool water supplied to the jacket to keep the inside of the tank at 20° C. This was then sieved with a 150 μm mesh to obtain a toner 2. The specifics of the fine particle are shown in Table 5, and the physical property values for the toner 2 in Table 6.

TABLE 5

| | Structure | Surface treatment | Number-average particle diameter (nm) |
|---|---|---|---|
| Titanium oxide fine particle 1 | Titanium oxide (rutile) | i-butyl triethoxysilane treatment | 33 |
| Titanium oxide fine particle 2 | Titanium oxide (anatase) | i-butyl triethoxysilane treatment | 6 |
| Silica fine particle 1 | Silicon dioxide (manufactured by sol-gel method) | Octyl triethoxysilane treatment | 102 |
| Silica fine particle 2 | Silicon dioxide (manufactured by vapor phase method) | Hexamethyl disilazane treatment | 12 |

Toners 3, 5, 7 to 12, 14 to 18

Toners 3, 5, 7 to 12 and 14 to 18 were obtained as in the manufacturing example of the toner 2 except that the combination of toner particle and fine particle was changed as shown in Table 6.

However, no step of mixing while heating to 45° C. was performed when the silica fine particle 1 was not used. The physical property values for the toners 3, 5, 7 to 12 and 14 to 18 are shown in Table 6.

TABLE 6

| | Toner particle | Silica fine particle 1 | Silica fine particle 2 | Titanium oxide fine particle 1 | Titanium oxide fine particle 2 | Weight-average particle diameter (D4) (μm) | Volume resistivity (Ω · cm) | Relative permittivity |
|---|---|---|---|---|---|---|---|---|
| Toner 1 | 1A | — | — | — | — | 6.7 | 2.9E+13 | 1.9 |
| Toner 2 | 1 | 2.0 | 2.0 | 6.0 | 0.0 | 6.7 | 1.7E+13 | 2.0 |
| Toner 3 | 2 | 2.5 | 2.5 | 7.4 | 0.0 | 5.4 | 1.7E+13 | 2.0 |
| Toner 4 | 2A | — | — | — | — | 5.4 | 2.9E+13 | 1.9 |
| Toner 5 | 1 | 0.0 | 2.0 | 0.0 | 2.0 | 6.7 | 1.0E+14 | 2.0 |
| Toner 6 | 3A | — | — | — | — | 8.4 | 5.4E+12 | 1.9 |
| Toner 7 | 3 | 0.0 | 1.6 | 0.0 | 4.8 | 8.4 | 1.3E+11 | 2.0 |
| Toner 8 | 1 | 0.0 | 2.0 | 0.0 | 6.0 | 6.7 | 1.3E+11 | 2.0 |
| Toner 9 | 4 | 0.0 | 2.8 | 0.0 | 2.8 | 4.8 | 1.0E+14 | 2.0 |
| Toner 10 | 4 | 0.0 | 1.6 | 0.0 | 4.8 | 4.8 | 1.3E+11 | 2.0 |
| Toner 11 | 1 | 0.0 | 2.0 | 0.0 | 10.0 | 6.7 | 4.0E+10 | 2.0 |
| Toner 12 | 3 | 1.6 | 1.6 | 4.8 | 0.0 | 8.4 | 1.7E+13 | 2.0 |
| Toner 13 | 1B | — | — | — | — | 6.7 | 2.9E+13 | 1.9 |
| Toner 14 | 5 | 1.3 | 1.3 | 4.0 | 0.0 | 6.7 | 1.3E+13 | 2.5 |
| Toner 15 | 6 | 2.2 | 2.2 | 6.6 | 0.0 | 6.1 | 1.7E+13 | 2.0 |
| Toner 16 | 7 | 3.1 | 3.1 | 9.3 | 0.0 | 4.3 | 1.7E+13 | 2.0 |
| Toner 17 | 1 | 0.0 | 2.0 | 0.0 | 15.0 | 6.7 | 1.0E+09 | 2.0 |
| Toner 18 | 6 | 0.0 | 2.0 | 0.5 | 0.0 | 6.1 | 1.3E+15 | 1.8 |

In the table, "2.9E+13" means $2.9 \times 10^{13}$.

Manufacturing Example of Developing Roller

Developing Roller DR1

Forming Elastic Layer (Dd1, Dd2)

An SUS ø6 metal core was nickel plated as a shaft core, coated with a primer (product name DY39-012, Dow Toray), baked, and used. The resulting shaft core was installed concentrically in a cylindrical mold with an inner diameter of 11.5 mm.

The following materials were mixed with a Trimix to obtain an additive silicone rubber composition as a material for the elastic layer, and this was injected into the mold, which had been heated to 115° C.

| | |
|---|---|
| Liquid dimethyl polysiloxane having at least 2 alkenyl groups bound to silicon atoms in the molecule (product name: DMS-V41, Gelest) | 100 parts |
| Dimethyl polysiloxane having at least 2 hydrogen atoms bound to silicon atoms in the molecule (product name: HMS-151, Gelest) | 5 parts |
| Platinum catalyst (SIP6832.2, Gelest) | 0.048 parts |
| Carbon black (Toka Black #7360SB, Tokai Carbon) | 18 parts |
| Quartz (Y-60, Tatsumori Ltd.) | 20 parts |

After the materials were injected, they were heat molded for 10 minutes at 120° C., cooled to room temperature, and removed from the mold to obtain an elastic layer Dd1 integrated with the conductive substrate.

The elastic layer Dd2 was formed in the same way as the elastic layer Dd1 except that 12 parts of the carbon black were used.

Preparing Conductive Coatings (DT1, DT2) 23 parts of an isocyanate compound (product name: Millionate MT, Tosoh Corp.) were mixed with 100 parts of a polyol compound (product name: polytetramethylene glycol PTG 1000SN, Hodogaya) in stages in a methyl ethyl ketone solvent, and reacted for 7 hours in a nitrogen atmosphere at 80° C. to obtain a polyurethane polyol A with a weight-average molecular weight Mw of 11,000 and a hydroxyl value of 20 mg KOH/g.

43 parts of an isocyanate compound (product name: Millionate MR-100, Tosoh Corp.) and 100 parts of polypropylene glycol with a number-average molecular weight of 400 (product name: Sannix PP-400, Sanyo Chemical) were then heated and reacted for 2 hours at 90° C. in a nitrogen atmosphere, after which methyl ethyl ketone was added to a solids concentration of 70%. The NCO % relative to the solids at this point was 4 mass %. 14 parts of methyl ethyl ketone oxime (Tokyo Chemical Industry) were then dripped in under conditions of reaction product temperature 50° C. to obtain a block polyisocyanate B.

The block polyisocyanate B was mixed into the polyurethane polyol A so as to obtain an NCO/OH group ratio of 1.4. Carbon black (product name: MA11, Mitsubishi Chemical) was mixed in in the amount of 30 parts per 100 parts of the resin solids, and this was dissolved and mixed in methyl ethyl ketone to a total solids content of 30 mass % and uniformly dispersed with a sand mill to prepare a conductive coating (DT1).

The block polyisocyanate B was also mixed separately into the polyurethane polyol A so as to obtain an NCO/OH group ratio of 1.4. Carbon black (product name: MA11, Mitsubishi Chemical) was mixed in in the amount of 30 parts per 100 parts of the resin solids, and Art Pearl C400 transparent (Negami Kogyo) was mixed in in the amount of 20 parts per 100 parts of the resin solids. This was dissolved and mixed in methyl ethyl ketone to a total solids content of 30 mass % and uniformly dispersed with a sand mill to prepare a conductive coating (DT2).

Forming Conductive Elastic Layers (DD1 to DD3)

The coating DT1 for forming the conductive resin layer was dip coated on the elastic layer Dd1 and dried, and then heat treated for 1.5 hours at 170° C. to form a conductive elastic layer DD1.

Similarly, the coating DT1 for forming the conductive resin layer was dip coated on the elastic layer Dd2 to form a conductive elastic layer DD2.

Similarly, the coating DT2 for forming the conductive resin layer was dip coated on the elastic layer Dd1 to form a conductive elastic layer DD3.

Preparing Surface Layer Coating ZT1

17.63 g of methyl triethoxysilane (Tokyo Chemical Industry), 46.23 g of ethanol and 3.90 g of deionized water were measured into a 100 ml glass container. Once a uniform solution had been obtained by stirring, 2.53 g of a 75% isopropyl alcohol solution of bis (2,4-pentanedionato) bis (2-propanolato) titanium (IV) (Tokyo Chemical Industry)

were added, and the resulting solution was refluxed for 3 hours to obtain a coating ZT1 for forming a surface layer.

Manufacturing Developing Rollers DR1, DR2 and DR4

The coating ZT1 for forming a surface layer was ring coated (total discharged amount: 0.100 ml, ring speed: 85 mm/s) on the previously prepared conductive elastic layer DD1, and heat treated for 1 hour at 90° C. to form a surface layer on the conductive elastic layer and manufacture a developing roller DR1.

A developing roller DR2 was manufactured by similarly ring coating the coating ZT1 for forming a surface layer on the conductive elastic layer DD2 and performing heat treatment.

The conductive elastic layer DD3 was evaluated as is as DR4 without a surface layer.

Developing Roller DR3

A developing roller installed in a commercial cyan 318 toner cartridge (Canon) was used as is as the developing roller DR3.

all-white image were output, and then one sheet of an all-black image was output. The apparatus was stopped during development from the developing roller to the photosensitive drum, the process cartridge was removed from the printer body, and the charge quantity of the toner on the developing roller before development was measured with an EST-1 E-Spart Analyzer charge distribution measurement device (Hosokawa Micron).

One sheet of an all-black image was then output in the same way, the apparatus was stopped at the point of transfer from the photosensitive drum to the intermediate transfer belt, and the charge quantity of the toner on the intermediate transfer belt was measured in the same way. Charge retention was measured according to the following standard based on the difference between the charge quantity on the developing roller and the charge quantity on the intermediate transfer belt. In this evaluation, the charge attenuation during the image formation process is less and charge retention is better the smaller the charge quantity difference.

TABLE 7

| | Elastic layer | Conductive coating | Conductive elastic layer | Surface layer | Volume resistivity per unit area Rdr(Ω/cm2) | Capacitance per unit area Cdr(pF/cm2) | Elementary processes |
|---|---|---|---|---|---|---|---|
| DR1 | Dd1 | DT1 | DD1 | ZT1 | 3.0E+07 | 440 | 2 |
| DR2 | Dd2 | DT1 | DD2 | ZT1 | 1.7E+08 | 365 | 2 |
| DR3 | | | — | | 8.0E+06 | 900 | 2 |
| DR4 | Dd1 | DT2 | DD3 | — | 5.2E+05 | 300 | 1 |

In the table, "3.0E+07" means $3.0 \times 10^7$.

Examples 1 to 17 and Comparative Examples 1 to 8

Evaluations were performed with the combinations shown in Table 7 using the above toners 1 to 18 and developing rollers DR1 to DR4. The evaluation results are shown in Table 8.

The evaluation methods and evaluation standards are explained below.

A modified LBP-7600C commercial laser printer (Canon) was used as the image-forming apparatus.

The apparatus was modified by connecting it to an external high-voltage power supply, allowing an arbitrary potential difference to be set between the charging blade and the charging roller, and setting the process speed to 120 mm/sec.

A commercial cyan 318 toner cartridge (Canon) was used as the process cartridge. The commercial toner and commercial developing roller were removed from the cartridge, which was then cleaned by air blowing and filled with 50 g of the toner for evaluation, and the developing roller for evaluation was mounted.

The commercial toner was also removed from the yellow, magenta, and black stations, and replaced with yellow, magenta, and black cartridges with the remaining toner detection mechanisms disabled for purposes of the evaluation.

Evaluating Charge Retention

The above process cartridge, the modified laser printer, and an evaluation paper (GF-0081 (Canon) A4: 81.4 g/$m^2$) were left for 48 hours in a high-temperature, high-humidity environment (30° C./80% RH, hereunder "H/H environment").

The potential difference between the charging blade and the charging roller was set to −400 V, 10 sheets of an Charge retention A: Charge quantity difference not more than 2 (μC/g)

B: Charge quantity difference more than 2 but not more than 5 (μC/g)

C: Charge quantity difference more than 5 but not more than 10 (μC/g)

D: Charge quantity difference more than 10 (μC/g)

Evaluating Charge Rising Performance

The above process cartridge, the modified laser printer, and an evaluation paper (GF-0081 (Canon) A4: 81.4 g/$m^2$) were left for 48 hours in a low-temperature, low-humidity environment (15° C./10% RH, hereunder "L/L environment").

The potential difference between the charging blade and the charging roller was set to −400 V, and one sheet of an all-white image was output. The apparatus was stopped during image formation, the process cartridge was removed from the printer body, and the charge quantity of the toner on the developing roller was measured with an EST-1 E-Spart Analyzer charge distribution measurement device (Hosokawa Micron).

One sheet of an all-white image was then output in the same way. The apparatus was stopped during image formation, the process cartridge was removed from the printer body, and the charge quantity of the toner on the developing roller was measured with an EST-1 E-Spart Analyzer charge distribution measurement device (Hosokawa Micron). The charge rising performance was evaluated according to the following standard based on the difference between the first charge quantity and the second charge quantity. In this evaluation, the smaller the difference in charge quantity is, the better the charge rising performance is.

Charge rising performance

A: Charge quantity difference not more than 2 (μC/g)

B: Charge quantity difference more than 2 and not more than 5 (μC/g)

C: Charge quantity difference more than 5 and not more than 10 (μC/g)

D: Charge quantity difference more than 10 (μC/g)

Evaluating Charge Quantity Distribution

The above process cartridge, the modified laser printer, and an evaluation paper (GF-0081 (Canon) A4: 81.4 g/m$^2$) were left for 48 hours in a low-temperature, low-humidity environment (15° C./10% RH, hereunder "L/L environment").

The potential difference between the charging blade and the charging roller was set to 0 V, and one sheet of an all-white image was output. The apparatus was stopped during image formation, the process cartridge was removed from the printer body, and the charge quantity distribution of the toner on the developing roller was measured with an EST-1 E-Spart Analyzer charge distribution measurement device (Hosokawa Micron). The charge quantity distribution at this point corresponds to the charge quantity distribution from triboelectric charging.

The potential difference between the charging blade and the charging roller was set to −400 V, and one sheet of an all-white image was output. The apparatus was stopped during image formation, the process cartridge was removed from the printer body, and the charge quantity distribution of the toner on the developing roller was measured with an EST-1 E-Spart Analyzer charge distribution measurement device (Hosokawa Micron). The charge quantity distribution at this point corresponds to the charge quantity distribution from both triboelectric charging and injection charging.

The charge quantity distribution at a potential difference of −400 V was compared with the half width of the charge quantity distribution at a potential difference of 0 V, and since the effect of injection charging on sharpening the charge quantity distribution is thought to be greater the greater this difference, the charge quantity distribution was evaluated based on the half width at a potential difference of −400 V as a multiple the half width at a potential difference of 0 V.

Charge quantity distribution

A: Not more than 0.60 times

B: More than 0.60 and not more than 0.70 times

C: More than 0.70 and not more than 0.90 times

D: More than 0.90 times

Evaluating Durability

The above process cartridge, the modified laser printer, and an evaluation paper (GF-0081 (Canon) A4: 81.4 g/m$^2$) were left for 48 hours in a normal-temperature, normal-humidity environment (23° C./50% RH, hereunder "N/N environment").

The potential difference between the charging blade and the charging roller was set to −400 V, and one sheet of an all-white image was output. The apparatus was stopped during image formation, the process cartridge was removed from the printer body, and the charge quantity of the toner on the developing roller was measured with an EST-1 E-Spart Analyzer charge distribution measurement device (Hosokawa Micron).

1,000 sheets of an image with a print percentage of 2% were then output. Next, one sheet of an all-white image was output. The apparatus was stopped during image formation, the process cartridge was removed from the printer body, and the charge quantity of the toner on the developing roller was measured with an EST-1 E-Spart Analyzer charge distribution measurement device (Hosokawa Micron). Durability was evaluated according to the following standard based on the difference between the initial charge quantity and the charge quantity after output of 1,000 sheets.

Durability

A: Change in charge quantity not more than 5 (μC/g)

B: Change in charge quantity more than 5 but not more than 10 (μC/g)

C: Change in charge quantity more than 10 but not more than 20 (μC/g)

D: Change in charge quantity more than 20 (μC/g)

TABLE 8

| | Toner | Developing roller | Cdr/Ctn | Rdr/Rtn | Elementary processes | Charge retention | Charge rising performance | Charge quantity distribution | Durability |
|---|---|---|---|---|---|---|---|---|---|
| Example 1 | 1 | DR2 | 2.2 | 5.8.E−03 | 2 | A | A | A | A |
| Example 2 | 2 | DR2 | 2.1 | 9.5.E−03 | 2 | A | A | C | B |
| Example 3 | 3 | DR2 | 1.7 | 1.2.E−02 | 2 | B | A | C | B |
| Example 4 | 4 | DR3 | 4.5 | 3.5.E−04 | 2 | C | B | B | B |
| Example 5 | 3 | DR3 | 4.2 | 5.8.E−04 | 2 | C | B | C | C |
| Example 6 | 5 | DR2 | 2.1 | 1.7.E−03 | 2 | A | A | C | B |
| Example 7 | 6 | DR2 | 2.8 | 2.4.E−02 | 2 | A | A | A | A |
| Example 8 | 7 | DR1 | 3.2 | 1.9.E−01 | 2 | B | B | C | B |
| Example 9 | 5 | DR1 | 2.6 | 3.0.E−04 | 2 | A | B | C | B |
| Example 10 | 8 | DR1 | 2.6 | 2.4.E−01 | 2 | B | A | C | B |
| Example 11 | 9 | DR1 | 1.8 | 4.2.E−04 | 2 | A | B | C | B |
| Example 12 | 10 | DR1 | 1.8 | 3.3.E−01 | 2 | B | A | C | B |
| Example 13 | 11 | DR1 | 2.7 | 7.5.E−01 | 2 | C | A | C | B |
| Example 14 | 3 | DR1 | 2.6 | 1.7.E−03 | 2 | A | A | C | B |
| Example 15 | 12 | DR1 | 3.3 | 1.4.E−03 | 2 | B | A | C | B |
| Example 16 | 13 | DR1 | 2.7 | 1.0.E−03 | 2 | A | A | A | A |
| Example 17 | 14 | DR1 | 2.0 | 2.2.E−03 | 2 | A | A | C | B |
| Comparative Example 1 | 8 | DR4 | 1.8 | 4.1.E−03 | 1 | D | A | D | C |
| Comparative Example 2 | 15 | DR3 | 4.8 | 5.1.E−04 | 2 | D | B | C | C |
| Comparative Example 3 | 3 | DR4 | 1.7 | 3.0.E−05 | 1 | A | D | C | C |
| Comparative Example 4 | 16 | DR2 | 1.4 | 1.5.E−02 | 2 | D | B | C | C |

TABLE 8-continued

| | Toner | Developing roller | Cdr/Ctn | Rdr/Rtn | Elementary processes | Charge retention | Charge rising performance | Charge quantity distribution | Durability |
|---|---|---|---|---|---|---|---|---|---|
| Comparative Example 5 | 8 | DR2 | 2.2 | 1.3.E+00 | 2 | D | C | C | B |
| Comparative Example 6 | 17 | DR1 | 2.7 | 3.0.E+01 | 2 | D | D | C | D |
| Comparative Example 7 | 18 | DR1 | 2.5 | 2.5.E−05 | 2 | A | D | D | A |
| Comparative Example 8 | 18 | DR4 | 1.7 | 4.4.E−07 | 1 | A | D | D | B |

In the table, 5.8.E−03 means $5.8 \times 10^{-3}$.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-191173, filed Nov. 17, 2020, which is hereby incorporated by reference herein in its entirety.

What is claimed is:

1. A developing apparatus, comprising:

a toner comprising a toner particle having a metal compound particle on a surface of the toner particle;

a toner bearing member configured to bear the toner, the toner bearing member having a two-layer configuration comprising a conductive elastic layer and a surface layer; and a toner regulating member contacting the toner bearing member and being configured to regulate the toner borne on the toner bearing member, wherein a volume resistivity of the toner as determined by impedance measurement is $1.0\times10^{10}$ to $1.0\times10^{14}$ Ω·cm, the toner bearing member exhibits an elementary process of an RC parallel circuit model attributable to the conductive elastic layer and an elementary process of an RC parallel circuit model attributable to the surface layer in the impedance measurement, a volume resistance value Rdr per unit area of the toner bearing member is from $5.0\times10^{5}$ to $2.0\times10^{8}$ Ω/cm$^2$, a capacitance Cdr per unit area of the toner bearing member is from 300 to 900 pF/cm$^2$, and $$1.5\leq(Cdr/Ctn)\leq4.5 \text{ and } 1.0\times10^{-4}\leq(Rdr/Rtn)\leq1.0$$

where Ctn (pF/cm$^2$) is a capacitance per unit area of the toner and Rtn (Ω/cm$^2$) is a volume resistance value per unit area of the toner as converted by a parallel plate capacitor model at a thickness of 1.5 times a weight-average particle diameter D4 of the toner as obtained by an electrical detection band method based on the volume resistivity and capacitance obtained by the impedance measurement.

2. The developing apparatus according to claim 1, wherein the volume resistivity of the toner as determined by the impedance measurement is $1.0\times10^{11}$ to $1.0\times10^{14}$ Ω·cm.

3. The developing apparatus according to claim 1, wherein the toner particle comprises an organosilicon polymer on a surface thereof.

4. The developing apparatus according to claim 3, wherein the organosilicon polymer forms a shell, and the toner particle comprises a toner base particle having the shell on a surface of the toner base particle.

5. The developing apparatus according to claim 1, wherein the metal compound particle comprises a polyvalent acid metal salt.

6. The developing apparatus according to claim 5, wherein the polyvalent acid metal salt comprises a phosphoric acid metal salt.

7. The developing apparatus according to claim 1, wherein the toner bearing member comprises on an outermost surface thereof a surface layer comprising an organosilicon polymer.

8. The developing apparatus according to claim 1, wherein the toner particle comprises an organosilicon polymer on a surface thereof, and the toner bearing member comprises an organosilicon polymer on an outermost surface thereof.

* * * * *